United States Patent [19]

Jon et al.

[11] Patent Number: 5,955,126

[45] Date of Patent: Sep. 21, 1999

[54] SELF-COLORING FOOD CASING

[75] Inventors: Shiu-Chung Jon, Westmont; Rama Ramagopal, Bolingbrook; Myron Donald Nicholson, Lamont, all of Ill.

[73] Assignee: Viskase Corporation, Chicago, Ill.

[21] Appl. No.: 08/124,063

[22] Filed: Sep. 21, 1993

[51] Int. Cl.⁶ .................................................. A22C 13/00
[52] U.S. Cl. ........................................... 426/105; 426/135
[58] Field of Search ............................ 426/93, 105, 135, 426/250, 540; 138/118.1; 428/34.8

[56] References Cited

U.S. PATENT DOCUMENTS

| | | |
|---|---|---|
| 2,477,767 | 8/1949 | Remer . |
| 2,477,768 | 8/1949 | Remer . |
| 2,861,891 | 11/1958 | Baverfeind et al. ..................... 426/540 |
| 3,943,262 | 3/1976 | Winkler et al. ....................... 426/540 X |
| 4,285,981 | 8/1981 | Todd, Jr. et al. ........................ 426/250 |
| 4,380,553 | 4/1983 | Schmidt ................................... 426/250 |
| 4,442,104 | 4/1984 | Wedral et al. ........................... 426/250 |
| 4,548,822 | 10/1985 | Schmidt ..................................... 426/96 |
| 4,699,664 | 10/1987 | Hettiarachchy et al. ............ 106/288 Q |
| 4,759,936 | 7/1988 | Best et al. ............................... 426/250 |
| 4,877,626 | 10/1989 | Ande et al. .............................. 426/250 |
| 5,079,016 | 1/1992 | Todd, Jr. .................................. 426/250 |
| 5,139,800 | 8/1992 | Anderson et al. ...................... 426/243 |

FOREIGN PATENT DOCUMENTS

| | | |
|---|---|---|
| 2258798 | 2/1975 | France . |
| WO 91/03917 | 3/1991 | WIPO . |

*Primary Examiner*—Arthur L. Corbin
*Attorney, Agent, or Firm*—Cedric M. Richeson

[57] ABSTRACT

Bixin containing coloring compositions and self-coloring casings, particularly tubular cellulosic food casings, coated therewith, which compositions contain bixin, a water-soluble film forming agent, preferably hydroxypropylcellulose, a polyphosphate and optionally an antioxidant.

34 Claims, 1 Drawing Sheet

SELF-COLORING FOOD CASING

BACKGROUND AND RELATED ART

The present invention relates to bixin colorant compositions and self-coloring food casing, preferably cellulosic food casing. Self-coloring casings have colorant coatings which are transferable to the encased foodstuff during processing.

In some areas of the world it is customary to eat sausages, particularly small diameter (circumference <115 mm) sausages, which have been colored on the sausage surface by application of a colorant. Historically, different colorants have been applied to sausage surfaces by various means. For example, sausages have been colored by smoking with gaseous or liquid wood smoke, by dipping peeled sausages into a vat containing a colorant, by spraying or dipping encased sausages with a casing permeable liquid dye, and also by stuffing sausage meat into casings having their interior surfaces coated with a transferable colorant. In the United States, coloring of sausage products encased in natural animal casings in which the colorant was retained in the casing was authorized by the United States Department of Agriculture (U.S.D.A.) at least as early as 1922. Use of self-coloring cellulosic casings made with synthetic colorants was approved by the U.S.D.A. in 1947 and such casings have been commercially available since 1948. In different regions of the world, different colors range in popularity and some colorants may impart flavor as well as color. In certain areas orange and orange-red colored sausages are extremely popular.

In Brazil, a very popular sausage is made by dipping cooked and peeled sausages in a vessel containing heated, water-soluble annatto colorant (norbixin in water). Residence time of the sausage with the colorant in the vessel is dependent upon the concentration and temperature of the colorant and may be e.g. for a period of 5 minutes or less at high temperature or for a longer period of time (up to 20 minutes or longer) at elevated but relatively lower temperatures to produce the desired coloration. This water-soluble annatto colorant is fixed to the surface of the sausage by contact with an acid, typically phosphoric acid.

This method has several disadvantages e.g. time, labor, maintenance and equipment costs associated with separate equipment for dipping or otherwise coating the sausage with colorant, and energy costs, particularly associated with heating the above colorant. Also, the mechanisms for providing a continuous process of introducing uncolored sausages and removing colored sausages may result in broken or abraded sausages, and the residence time in the vat varies from sausage to sausage causing undesirably and perceptibly different shades of color. It is highly desirable that the colored sausages have a uniform color not only with respect to each individual sausage, but also within the same lot of sausages produced, and between lots produced from one day to the next, or from week to week, or month to month and so on. Uniformity of color is desired by the customer.

Also, the long residence time of cooked and peeled sausages in the heated annatto is believed to enhance the possibility of increased microbial growth and decreased shelf life of the colored sausages. Furthermore, annatto colorant is expensive and application by coating or dipping in a vessel or vat requires that the vessel or vat be periodically cleaned and the colorant recycled to remove by-products formed by the dipping procedure such as meat pieces and accumulated fats. All of this requires additional expense and time for equipment and maintenance. During use the colorant must be frequently replenished as it is depleted or the color intensity of the coated sausages will become undesirably light. Also, the colorant must be periodically replaced because it becomes less effective after constant use at elevated temperatures. In addition, the application of acid such as phosphoric acid to further bind the annatto colorant to the meat may require an additional separate vat and related equipment including equipment to facilitate both processing and recycling.

Various patents disclose coloring or flavor compositions including compositions which contain annatto, norbixin or bixin.

U.S. Pat. No. 4,285,981 (Todd, Jr. et al.) issued in 1981 and discloses liquid seasoning compositions useful for flavoring or coloring foods and beverages. The disclosed compositions are purportedly dispersible in both oil and water, and consist essentially of lecithin, tartaric acid esters of mono- and di-glycerides, and one or more edible flavorants or colorants such as annatto extract, bixin or norbixin. The colorants may be used in an amount between 1–20% by weight of the composition.

U.S. Pat. No. 4,699,664 (Hettiarachchy et al.) issued in 1987 and discloses a process for preparation of natural pigment complexes having improved stability against oxygen, heat, light and moisture, and which are water soluble under acidic conditions. In the disclosed process, a pigment such as bixin, norbixin or betanin is combined with at least one inorganic polyvalent cation source and with at least one hydrocolloid having at least one carboxyl group in an aqueous alkaline medium. The hydrocolloid may be modified cellulose, or derivatives or salts thereof. Compositions are also claimed in which a polyvalent cation is associated with both the pigment and the hydrocolloid through their respective carboxyl groups.

U.S. Pat. No. 4,877,626 (Ande et al.) which issued in 1989 discloses that a mixture of liquid smoke, caramel and optionally bixin (or annatto) may be used to color raw meat.

U.S. Pat. No. 4,759,936 (Best et al.) which issued in 1988 discloses a food coloring composition which may comprise annatto, an oil (preferably of triglycerides), an emulsifier (preferably of monoglycerides, diglycerides or mixtures thereof), and a gelling agent of carrageenan and water. The gelled emulsion may also comprise glycerol. A gelling agent of guar gum and gelatin is also suggested.

U.S. Pat. No. 5,079,016 (Todd, Jr.) which issued on Jan. 7, 1992 discloses color stabilized carotenoid pigment compositions which consist essentially of an annatto, tomato, carrot, marigold, or synthetic carotenoid in combination with a nonionic surfactant which is selected from the group of:

a) mono and diglycerides of fatty acids;

b) polyglyceride esters of fatty acids;

c) mono and diglyceride esters which are further esterified with a dibasic organic acid which is either a citric or lactic acid;

d) acetylated mono and diglyceride esters further esterified with a dibasic organic acid which is either a citric or a lactic acid;

e) sorbitan esters of fatty acids;

f) propylene glycol esters of fatty acids; and g) lecithin.

U.S. Pat. No. 5,139,800 (Anderson et al.) which issued Aug. 18, 1992 discloses a composition comprising a dispersed phase consisting essentially of a colorant (or a colorant dissolved or dispersed in an oil-immiscible medium) and a continuous phase consisting essentially of an oil or edible fat, wherein the composition is colorless when applied to food, but causes browning upon cooking. The colorant may comprise water soluble annatto, beet powder, carmine or caramel among others. The oil may be a vegetable oil or partially hydrogenated vegetable oil among others. The composition may further comprise an emulsifier such as mono-and diglycerides. The composition may also include a viscosifying agent in an amount of from about 0.01 to about 1 percent by weight. This viscosifying agent may be hydroxypropylcellulose, carboxymethylcellulose, methyl cellulose, agar, pectin, starch, gelatin, xanthin gum, or guar gum among other agents. The composition may also include a film forming agent, preferably hydroxypropylcellulose or methyl cellulose. Other suitable film forming agents are said to include zein, arabinogalactan, and carboxymethylcellulose among others. Also, the composition may further comprise an oil soluble colorant such as oil soluble annatto in a concentration of from about 0.01 to about 2 percent of the composition. The composition is disclosed as being suitable for application to foodstuffs including poultry, beef, fish, cheese, pork, fruits and vegetables.

Self-coloring food casings used in the processed food industry are generally thin-walled tubing of various diameters, typically prepared from cellulose. In general, these food casings have multifunctional uses in that they may be employed as containers during the processing of the food product encased therein and also serve to transfer colorant to the encased foodstuff to color the surface of the finished product. Typically the encased foodstuff is sausage made from beef, pork, chicken, turkey or other meats. In the sausage meat industry, the preparation of various types of sausages including wieners or frankfurters in a variety of sizes usually involves removing the casing from around the processed meat prior to final packaging. These sausages, from which the casing is usually removed prior to sale, are generally processed in nonfiber-reinforced (nonfibrous) cellulose casing. However, larger diameter sausages such as salami are frequently sold with the casing left on. These sausages are usually packaged in fiber-reinforced (fibrous) cellulosic casing or nylon casing. Self-coloring casing transfers colorant to the sausage surface during processing so that the sausage surface remains colored after removal of the casing.

In the manufacture of nonfibrous regenerated cellulose sausage casings which are self-coloring, viscose is typically extruded through an annular die into a coagulating and regenerating bath to produce a tube of regenerated cellulose. This tube is subsequently washed, plasticized e.g. with glycerine, impregnated with a water-soluble, casing-permeable colorant, and dried e.g. by inflation under substantial air pressure. After drying, the self-coloring casing is wound on reels and subsequently shirred on high-speed shirring machines, such as those described in U.S. Pat. Nos. 2,984,574, 3,451,827 3,454,981; 3,454,982; 3,461,484; 3,988,804 and 4,818,551. In the shirring process, typically lengths of from about 40 to about 200 or more feet of casing are compacted (shirred) into tubular sticks of between about 4 and about 30 inches. These shirred casing sticks are packaged and provided to the meat processor who typically causes the casing sticks to be deshirred at extremely high speeds while stuffing the deshirred casing with a meat emulsion. The meat can be subsequently cooked or pasteurized and the casing removed from the meat processed therein with high-speed peeling machines. The resulting peeled sausage is colored by the colorant which has transferred from the casing to the surface of the sausage during cooking or pasteurization. Uncolored nonfibrous casings are made in a similar fashion, but without the color additive steps.

For fibrous casing, a process of manufacture similar to that for nonfibrous casing is employed, however, the viscose is extruded onto one or both sides of a tube which is usually formed by folding a web of paper so that the opposing side edges overlap. In production of fibrous casing the viscose impregnates the paper tube where it is coagulated and regenerated to produce a fiber-reinforced tube of regenerated cellulose. The fibrous or paper reinforcement is generally utilized in tubular casing having diameters of about 40 mm or more in order to provide dimensional stability particularly during stuffing with meat emulsion.

Production of both nonfibrous and fibrous casing is well-known in the art and the present invention may utilize such well known processes and casings.

Cellulosic casings are typically humidified to a level sufficient to allow the casing to be shirred without undue breakage from brittleness, yet humidification must be at a level low enough to prevent undue sticking of the casing to the shirring equipment e.g. the mandrel during the shirring operation. Often a humectant is employed to moderate the rate of moisture take up and casing swelling, to produce a casing which during the shirring operation has sufficient flexibility without undue swelling or stickiness. Typically, a lubricant such as an oil will also be used to facilitate passage of the casing through the shirring equipment e.g. over a shirring mandrel.

It has been useful to lubricate and internally humidify cellulose casings during the shirring process by spraying a mist of water and a stream of lubricant through the shirring mandrel. This is an economical, fast and convenient way to lubricate and/or humidify the casing to increase the flexibility of the casing and facilitate high speed shirring without undue detrimental sticking, tearing or breakage of the casing.

Cellulosic food casings suitable for use in the present invention will preferably have a moisture content of less than about 100 wt. % based upon the weight of bone dry cellulose (BDC). The term "bone dry cellulose" as used herein refers to cellulose such as regenerated, derivatized or nonderivatized cellulose and/or paper which has been dried by heating the cellulose in a convection oven at 160° C. for one hour to remove water moisture. In the formation of cellulosic casing an extruded cellulosic film forms what is known as gel stock casing having a high moisture content in excess of 100 wt. % BDC. This gel stock casing is unsuitable for stuffing with food such as meat emulsion, e.g. to form sausages, because it has insufficient strength to maintain control of stuffing diameter and prevent casing failure due to bursting while under normal stuffing pressure. Gel stock casing is typically dried to a moisture level well below 100 wt. % (BDC) which causes the cellulose to become more dense with increased intermolecular bonding (increased hydrogen bonding). The moisture level of this dried casing may be adjusted, e.g. by remoisturization, to facilitate stuffing. Such remoisturization or moisture adjustment, e.g. by drying to a specific level, for nonfibrous casing is typically to a level with a range of from about 5 to about 40 wt. % BDC. Small diameter nonfibrous casing, prior to shirring, will have a typical moisture content of about 10–20 wt. % BDC, and such small diameter nonfibrous casing when shirred will have a moisture content that has been adjusted to between about 20 to 40 wt. % BDC.

For fibrous casing, casing is commercially produced having a moisture content ranging from about 4 wt. % BDC to about 70 wt. % BDC. Typically, premoisturized, ready-to-stuff, fibrous casing which does not require additional soaking or moisturization will have a moisture content of from about 26 to about 70 wt. % BDC. Also, commercialized is fiber-reinforced casing having a moisture level between about 4 to about 25 wt. % BDC. Such low moisture casing will be soaked prior to stuffing by a food processor.

Also, thermoplastic casings such as polyamide casings made from monolayer or multilayer structures containing a nylon layer are known. Nylon casings comprising a blend of nylon with polyester are known as are multilayer casings of nylon with ethylene polymers or copolymers.

In the formation of skinless (casing removed) frankfurters, sausage proteins coagulate, particularly at the sausage surface, to produce a skin and allow formation of a liquid layer between this formed skin and the casing as described in U.S. Pat. No. 1,631,723 (Freund). In the art the term "skinless frankfurter" is understood to mean that the casing is or is intended to be removed and that such casing may be removed because of formation of a secondary "skin" of coagulated proteins on the surface of the frankfurter. This secondary skin forms the outer surface of the so called "skinless frankfurters". Skin formation is known to be produced by various means including the traditional smoke curing with gaseous smoke, low temperature drying, application of acids such as citric acid, acetic acid or acidic liquid smoke or combinations thereof. Desirably, this secondary skin will be smooth and cover the surface of the frankfurter. Formation of a liquid layer between the casing and the frankfurter skin facilitates peeling and relates to the meat emulsion formulation, percent relative humidity during the cooking environment, subsequent showering and steam application to the chilled frankfurter.

Also, application of certain types of coatings to the inside wall of food casings may afford improvement in the release characteristics of the casing from the encased sausage product. Use of peeling aids or release coatings has helped to overcome peelability problems associated with process variables. Following cooking, cooling and hydrating, peeling aids such as water-soluble cellulose ethers help release the casing from the frankfurter skin by formation of a peeling enhancing layer between the casing and the frankfurter skin.

In U.S. Pat. No. 3,898,348, the coating of internal surfaces of cellulose sausage casings with a homogeneous mixture of a water-soluble cellulose ether peeling aid and a pleat release agent selected from animal, vegetable, mineral and silicon oils and alkylene oxide adducts of partial fatty acid esters was taught. The coating is applied to the casing surface in a composition such that the pleat release agent is present in a proportion of about 0.1 times the weight of the water soluble cellulose ether and up to about 0.5 milligrams per square inch of casing surface. Such mixtures have excellent meat release characteristics and can also effectively protect the casing from "pinholing" failures occasioned by pleat locking. Easy peeling casings utilizing the release coating have found broad commercial acceptance and are presently in use in casings throughout the world.

U.S. Pat. No. 4,137,947 to Bridgeford discloses a method of improving the meat release (peelability) of cellulose sausage casings by the application of a meat release coating to the internal surface thereof. The coating comprises a homogeneous admixture of a water-soluble cellulose ether, the partial fatty acid ester of sorbitan or mannitan and a water-soluble polyalkylene ether of the type $R(-OC_2H_4O)_n-H$ wherein R represents long chain alkyl radicals having 8 to 16 carbon atoms and n is an integer from 4 to 40. An aqueous coating composition containing the water-soluble cellulose ether, partial fatty acid ester and polyalkylene ether is typically applied to the interior of the sausage casing prior to shirring.

The foregoing peeling aid coatings have been utilized with varying degrees of success to provide cellulosic casings capable of being peeled on high speed machine peelers. Generally such cellulosic casings either with or without peeling aid coatings have an approximately neutral pH with pH values typically falling within a range of about 5.9 to 8.6.

Use of various transferable colorants on food packaging including cellulosic casing has been known for some time.

Self-coloring casings are disclosed in U.S. Pat. Nos. 2,477,767; 2,477,768 and 2,521,101. These casings are designed to transfer color to the sausage surface. Such casings are generally either coated or impregnated with food grade water-soluble dyes and have also been made commercially available with nontransferable black or white or colored opaque stripes. Also, liquid smoke impregnated casings are known to transfer liquid smoke to the surface of sausages encased therein transfering a flavorant or colorant and also causing a browning reaction on the sausage surface. Casings having either nontransferable or transferable indicia, logos, words are also known e.g. U.S. Pat. Nos. 1,959,978; 2,301,564 and 4,917,924.

U.S. Pat. Nos. 2,477,767 and 2,477,768 (Remer) which both issued in 1949 and which are now expired were assigned to Transparent Package Company (Teepak) and disclose regenerated cellulose sausage casings uniformly treated with a transferable, edible natural coloring matter. Included in a list of such materials is annatto. The colorant may be applied with glycerine and/or other polyhydric alcohols or vegetable oil.

French Patent Publication No. 2,258,798 discloses use of cellophane coated with an annatto derived dye such as Na or K norbixin in combination with a xanthene-type food dye to color a meat surface.

PCT Publication No. WO 91/03917 published in 1991 and discloses a microwavable container having a coating of a transferable browning agent such as annatto. This disclosure states that the browning agent may be applied in microwave transparent material in an aqueous binder. The microwave transparent material purportedly may be any food grade plastics or cardboard material known for use in microwave containers such as cardboard (generally with a protective layer such as a polyester, polypropylene or nylon film). Suitable aqueous binders are said to include gelatin, starch, starch derivatives, gums and fat based binders such as palm kernel oil. Typical amounts of browning agent are disclosed as being applied suspended in a binder at a concentration of 0.1 to 2% by weight with drying for 6 to 10 minutes at 60° C. to achieve physical stability so that the coating does not flake or rub off. It is further suggested that other additives may be present in the coating including flavorings such as sweeteners and emulsifiers such as lecithin to facilitate dispersion.

Also, shirred cellulosic casings have been obtained from the marketplace which are believed to have had a nonuniform coating of bixin, phosphate and vegetable oil on the inner surface of the casing. Such casings transfer color to sausages, but disadvantageously an undesirably large amount of the color may be wiped off unless the sausage is treated with a separate phosphoric acid solution. Also, the color transferred from these casings tends to be nonuniform varying from light to dark orange with distinct lines of color associated with shirring folds and edges of flattened and reeled casing. Peeled sausages made in such casing continue to require contact with colorant in a dip tank and a subsequent acid dip to provide a product having commercially acceptable color uniformity and intensity. The vacuum packaged frankfurters made with this casing exhibit an undesirable colored purge. These casings in the shirred form also have poor coherency.

In certain parts of the United States orange to orange-red sausages are very popular. Typically these colored sausages are made using self-coloring casings dyed with synthetic colorants such as coal tar dyes which have been approved by government regulation for use on food. These dyes, which are typically known as F.D. & C. dyes are typically applied to cellulosic casings by dipping gel stock casing into a tank containing an aqueous mixture of glycerine and the F.D. & C. dyes. A combination of water-soluble red and yellow F.D. & C. colorants produce an orange color and these colorants permeate and migrate through the wall of cellulose casing dipped therein so that colorants applied to the exterior of gel stock casing migrate through the casing to the interior surface. The gel stock casing is then dried, forming semi-finished casing. Semi-finished casing may be shirred directly in a continuous operation from the gel stock casing or it may be wound on reels and subsequently formed into shirred sticks and used conventionally.

Disadvantageously, these F.D. & C. dyes upon transfer to the surface of a sausage have a tendency to penetrate into the sausage and migrate away from the surface towards the center of the sausage. Such migration is undesirable, because the customer prefers that only the coagulated proteinaceous surface skin be colored, and not the interior of the sausage. Also, where blends of these colorants are used such migration may occur at different rates and to different extents thereby producing a chromatographic effect where the sausage in cross-section may have different colors e.g. red, orange, yellow as well as the natural meat color, because of separation of constituent dyes of a blended colorant as the individual dyes migrate away from the sausage surface at different rates of speed.

Also, in some markets only natural colorants (derived from biological organisms), such as cochineal, turmeric, annatto and caramel are authorized by law and use of synthetic (fossil-fuel derived or nonbiologically derived) colorants such as coal tar dyes is not authorized. This is especially true for many South American and Asian markets where use of natural colorants derived from plants or animals are preferred by custom or law.

In addition, in the United States, from time to time certain F.D. & C. colorants have been removed from the list of governmentally approved colorants thereby creating customer apprehension regarding use of all such coal tar-derived colorants. There also exists a preference amongst many consumers for food colorants which are naturally derived from renewable plants or animals over synthetically derived colorants.

Natural colorants, such an annatto, either in the oil-soluble form of bixin or the water-soluble form of norbixin, are less stable than synthetic dyes and tend to oxidize in the presence of air or under light thereby causing fading and loss of color intensity. Also, natural colorants will vary in shading and color may change during processing. The color appearance of a natural colorant such as bixin or norbixin may vary from one sausage product to another depending upon such factors as sausage formulation and processing conditions including e.g. relative humidity and acid showering. Changes in pH of the colorant coating caused by process variations may produce pH based color changes.

Bixin is not soluble in water and also is not easily dispersed in water by itself. Attempts to disperse bixin (or bixin with oil) in water generally yield poor dispersions which have little or no affinity for cellulose films. Dispersions consisting of bixin in water, or bixin and oil in water, produce nonuniform, undesirably uneven coatings on cellulose casing which are commercially unacceptable.

SUMMARY OF THE INVENTION

The present invention seeks to overcome the aforementioned deficiencies including those deficiencies found in prior art annatto compositions and self-coloring casings by providing a transferable, uniformly coloring composition and a machine peelable casing coated therewith. The inventive casing has a colorant coating which has preferential substantivity to a proteinaceous and fat containing foodstuff such as meat, cheese or processed beans.

The coloring composition according to the present invention comprises a dispersion of bixin in a water-soluble and/or alcohol-soluble film forming agent of a cellulose derivative, a protein, a dextrin, a shellac, a starch or a starch derivative. Preferred are water-soluble agents especially the water-soluble cellulose ethers, particularly hydroxypropyl cellulose. Mixtures of film forming agents may also be used.

The bixin mixture may also include other components. For example, it may be desirable to include an antioxidant such as a tocopherol, ascorbate, erythorbic acid, BHT or BHA to stabilize the colorant composition and prolong its shelf life and maintain its colorant intensity. Also, a polyphosphate such as sodium tripolyphosphate may similarly stabilize color and may also promote color transfer from casing to foodstuff. A preferred antioxidant is vitamin E. Drying agents, including alcohols such as ethanol, may be included in the colorant composition to facilitate drying of the bixin coloring composition on the casing. Surprisingly, it has been discovered that inclusion of alcohol in the composition reduces the amount of colorant which easily comes off of a sausage after processing by either washing with water, touching or incidental skin contact, or by rubbing with a paper towel or hand. Generally, water is used as a carrier for the colorant components and to facilitate coating of the colorant composition on the casing surface. Some oils, especially vegetable oils, may be added in small amounts (beneficially less than 10% of the coating weight) to assist flow of the bixin colorant composition across the casing surface to promote uniformity of the coating both on the casing and ultimately, when transferred, on the sausage surface. It is further believed that the presence of oil provides a desirable shade of orange when combined with the bixin. Also, glycerine may be added to the composition to promote uniformity of the coating. Glycerine may be provided in the coating in an equilibrium amount relative to the glycerine impregnated in the casing wall so that the glycerine impregnated in the casing will not migrate to the coating from the casing. Compositions of the invention may also include emulsifiers such as lecithin. In order to promote fixation of transferred bixin on a foodstuff, the colorant composition may include shellac or an edible wax such as beeswax, carnauba wax or candelilla wax.

Also, in order to facilitate formation of self-sustaining, deshirrable, shirred sticks of casing having easy peeling properties, the inventive compositions may also preferably contain a peeling aid such as carboxymethyl cellulose, an anti-pleat lock agent, such as an oil, and a surfactant. Other ingredients may also be utilized in a coating composition. Typically employed casing additives are known to the art and may include, for example, humectants, antimycotics, lubricants and antiblock agents. However, it is essential to the present invention that the bixin be dispersed in the film forming agent i.e. individual bixin particles must be coated with the film forming agent to prevent agglomeration, and therefore form a protective colloid. Dispersing bixin in the film forming agent also develops color intensity. Additional film forming agent may be added by mixing to optimize pigment/binder ratio and further develop color intensity.

The food casing according to the present invention has a surface coating, preferably an inner surface coating, which comprises a transferable colorant coating of a dispersion of bixin in a water-soluble and/or alcohol-soluble film forming agent of a cellulose derivative, a protein, a dextrin, a shellac, a starch or a starch derivative in an amount effective to color a foodstuff encased thereby. This mixture is coated on a packaging film surface preferably the inner surface of a tubular casing by conventional means in an amount sufficient to provide a self-coloring casing having a noticeable orange or reddish orange color which is transferable to a foodstuff surface by contact to provide a noticeably colored foodstuff surface. Such transfer is advantageously uniform if the encased foodstuff is cooked or pasteurized prior to removing the casing. Preferably the mixture will include a minor amount of alcohol and may include colorant coating stabilizers and other components as described above. The film forming agent is generally used with a carrier comprising water or alcohol or mixtures thereof. Water is the preferred carrier.

Both the inventive colorant composition and the inventive coated casing containing the colorant composition utilize bixin as the colorant. Use of bixin is a fundamental ingredient of the colorant composition and coating on the casing. Bixin is oil soluble and not soluble in water. The term "bixin" as it is used herein does not include norbixin.

It is essential to the present invention that the bixin be resinated with the film forming agent. In other words the bixin must be dispersed in a film forming agent preferably of a water-soluble cellulose ether. Bixin which is dispersed in a film forming agent such as hydroxypropylcellulose forms a coating which imparts a significantly higher color strength to the casing and after transfer to the sausage surface, e.g. during processing it produces a food surface having a stronger, more intense color than found with bixin-containing coatings in which the bixin is not dispersed in the film former.

The term "dispersion" as it is used here with respect to bixin means that bixin particles are resinated or coated with the film forming agent. Dispersion is accomplished by milling bixin with the film forming agent and the desired degree of fineness or fineness of grind cannot be accomplished by simple agitation or high speed mixing.

The term "gel stock casing" means cellulose casing in a gel state having a moisture content in excess of 100 weight % based upon the weight of bone dry cellulose (BDC) which casing after formation has not yet been dried to a moisture content below 100% BDC.

The term "semi-finished casing" with respect to thermoplastic casing means unshirred casing, and with respect to cellulose casing means unshirred casing in which gel stock casing has been dried to a moisture level well below 100 wt.% BDC thereby causing the cellulose to irreversibly become more dense with increased intermolecular bonding (increased hydrogen bonding). The moisture level of semi-finished cellulose casing may be adjusted, e.g. by remoisturization and may be above or below 100% by weight BDC. However, semi-finished cellulose casing cannot be converted back into gel stock by moisture addition. Semi-finished casing has not been shirred but may be flattened and wound on reels.

The term "nonfibrous" is used here to mean without use of fiber reinforcement (e.g. a paper tube) in the casing and nonfibrous is most commonly understood in the art to refer to casings without paper or a previously bonded fiber reinforcement. Nonfibrous casings are typically used to process small diameter sausages including wieners or frankfurters.

DETAILED DESCRIPTION

Figures 1, 2:
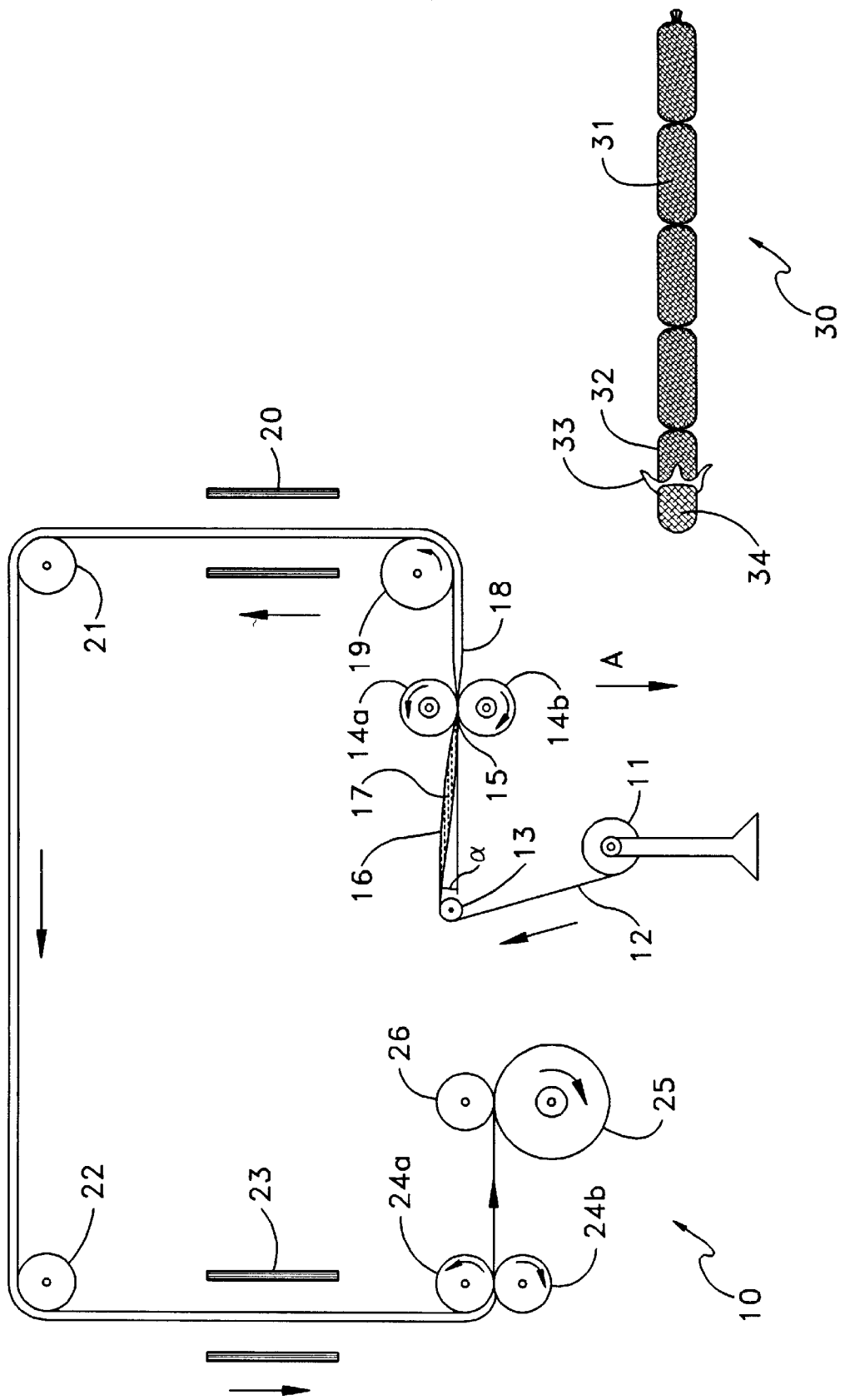
FIG. 1 is a schematic drawing of a slug coating process.
FIG. 2 is a plan view of encased sausages made according to the present invention.

The invention is a novel self-coloring food casing having a bixin colorant internal coating and a novel bixin colorant composition. The invention is particularly useful with small diameter casings, particularly tubular nonfibrous casings adapted for processing foodstuffs such as sausages and especially frankfurters. The novel colorant composition acts as a transferable colorant with preferential substantivity to the foodstuff surface, e.g. after cooking encased frankfurters, the casing may be peeled off and the surface of the sausage is uniformly colored with an orange colorant which does not easily wash or rub off of the sausage surface to an undesirable extent Casings may be made of any suitable material including monolayer or multilayer, large or small diameter, seamless or seamed tubular films of cellulose, collagen or thermoplastics such as nylon, polyethylene, polypropylene, ethylene vinyl alcohol copolymer, polyvinylidene chloride copolymer (PVDC) or polyvinyl alcohol, but preferably comprises cellulosic casings e.g. the well-known regenerated cellulose casing. Plastic coated cellulose casings may also be employed, such as PVDC coated fiber-reinforced cellulose casing. The plastic coating may be on either or both sides of the cellulose casing. In one embodiment of the invention the bixin-containing colorant composition is coated on the food contact surface of a fiber-reinforced cellulose casing which has an oxygen and moisture barrier coating on the opposite surface. This barrier coating is preferably a polyvinylidene chloride copolymer such as saran.

As the term is used herein, "casings" may be planar or tubular films, or may be in the form of pouches or bags. The casings may be enclosed about a foodstuff by any of the well known means in the art which depending upon the casing material used and package type may include e.g. twisting the casing, heat sealing to produce a fusion bond, pressure sealing (with or without heat) to produce a peelable seal, clipping, and sealing with an adhesive or wax.

The manufacture of such casings is well known in the art and one of ordinary skill is aware of the common variations in such parameters as moisture content, type and amounts of such additives as plasticizers, antimycotics, etc. Tubular casings are typically gathered into shirred sticks using well known processes and equipment. During the shirring operation it is common to coat the casing, particularly the inner surface of a tubular casing (e.g. by spraying), with a composition termed a shirr solution which may contain such ingredients as an anti-pleat lock agent, a lubricant, a surfactant, water and/or a humectant. Some components may serve multiple functions, e.g. when lecithin or mineral oil is used, these materials may act as anti-pleat lock agents and as lubricants which facilitate travel of the casing over a shirring mandrel or stuffing horn. Coating with a shirr solution is done to facilitate shirring of the casing and form easily deshirrable, self-sustaining sticks of shirred casing which are adapted for stuffing with products, particularly emulsions e.g. meat emulsions which form sausages.

An essential component of the coating for casings according to the present invention is bixin, also called cis-bixin. Bixin is a natural carotenoid colorant extracted from the pulpy seeds of the annatto tree (Bixa Orellana). Bixin ($C_{25}H_{30}O_4$) has a molecular weight of 394.5 and the following formula:

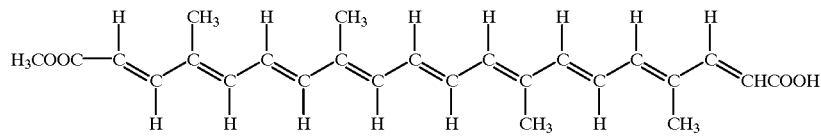

The bixin containing coloring composition of the present invention may be sprayed on the inner or outer surface of the casing e.g. on the inner surface with the shirr spray. Casings also may be coated by other means (including the well known methods of dipping and slugging). The bixin molecule does not pass through the casing wall and therefore it is preferable to slug the bixin colorant composition inside the casing and/or apply the bixin coloring composition to the casing inner surface via the shirr spray, because external application e.g. by dipping would require turning the casing inside out to provide contact between the colorant and the sausage surface. Application of other additives and coating compositions via solution spraying during or just prior to shirring is convenient, economical and facilitates placement of a regular measured distribution of a coating on the casing surface. For example, peeling aids such as carboxymethylcellulose may be added in the shirr spray as is taught in the art. Prior art colorant compositions have been applied by either or both slugging and spraying the inner surface of the casing via a shirring mandrel and such means are well known to those skilled in the art. Casings made according to the present invention, are preferably coated with the inventive bixin coating composition by slugging to provide a uniformly thick coating.

In one embodiment of the invention, casings (which may also be optionally treated with a flavorant or additional colorant such as caramel, a synthetic colorant or a liquid smoke such as acidic liquid smoke, particularly acidic tar-depleted liquid smoke) are internally coated with a colorant composition containing as essential components bixin dispersed in a film forming agent such as water-soluble cellulose ether. Preferably, the inventive composition will also contain an alcohol and an anti-oxidant or color stabilizer such as vitamin E and/or trisodium polyphosphate. In a most preferred embodiment, such colorant compositions will contain bixin dispersed in a film forming, water-soluble cellulose ether, a drying agent (which is preferably ethanol), a vegetable oil to promote uniformity of the casing and produce a desirable shade of orange, a surfactant (preferably a mixture of ethoxylated monodiglycerides) and glycerine for equilibrium with glycerine contained in the casing. Such glycerine helps to hold moisture in the casing. Lecithin may also be utilized as an emulsifier or surfactant, e.g. when used with vegetable oil.

The food casings of the present invention may be prepared from tubular casings, particularly non-fibrous casings of cellulose e.g. regenerated cellulose. These coated casings are fabricated in accordance with any of the known commercial methods of applying a coating composition, typically to the internal surface thereof. The coating composition components are more fully described below.

Bixin has a carboxyl end group and an esterified carboxyl end group. Upon saponification the methyl ester end group is changed to another carboxyl group thereby forming norbixin. Bixin is oil-soluble whereas norbixin is water-soluble. It has been found that over a time of about two weeks or more cellulose casing coated with norbixin becomes much less color transferable than bixin-coated cellulose casing. In contrast, water-insoluble bixin being dispersed in a water-soluble or alcohol-soluble film forming agent does not bind to cellulose to the same extent, but instead has a greater affinity for protein and fat containing foodstuffs such as sausage meat, cheese, tofu or texturized vegetable protein.

Besides bixin, another essential component of the coating suitable for use in accordance with the practice of the present invention is a water and/or alcohol-soluble film forming agent in which bixin particles may be finely dispersed. This film forming agent may be a water-soluble cellulose derivative such as water-soluble cellulose ethers, a water/alcohol-soluble protein such as zein, an alkaline water-soluble protein such as casein, a water-soluble dextrin or starch or derivatives thereof, or an alcohol-soluble or alkaline water-soluble shellac.

The film forming agent is typically dissolved in water, or a water and alcohol mixture and the bixin is dispersed therein by milling. Milling may be accomplished by adding commercially available powdered bixin to a film forming agent dissolved in water or an alcohol or a mixture thereof in a dispersion mill e.g. a ball mill, a vertical sand mill or a horizontal sand mill sold under the trademark Dyno-mill. The milling should be performed until a dispersion having a fineness of grind of at least 4 gu or less and preferably 3 or less gu is obtained. Suitable dispersions may have a fineness of grind of 2 gu or less, or greater than or equal to 2 and less than or equal to 3 gu as measured by ASTM D 1316 using a NPIRI Grindometer which is available from Precision Gage and Tool Co., Dayton, Ohio, U.S.A. Upon drying of the coating on the casing, the film forming agent is believed to act to promote a uniform colorant layer. It does this by holding the bixin in place as a uniform coating on the casing until it can be released during processing of sausages. During processing, high temperatures (typical cooking temperatures for sausages) and the presence of moisture both help to resolubilize the film forming agent and release the bixin dye pigment so that bixin particles may contact the sausage surface (typically a frankfurter or wiener style meat sausage). Use of alcohol is believed to reduce the amount of bixin colorant which washes off or rubs off of the sausage after processing and vacuum packaging. Also, use of shellac mixed into the colorant composition has been found to be very effective in eliminating or greatly reducing the amount of colorant rubbed off. Shellac has been found to be more effective than alcohol in this regard and may be used in an alcohol free colorant composition. It is further believed, without wishing to be bound by that belief, that the bixin particles in the present inventive compositions upon contact with the foodstuff (sausage) surface may be solubilized by fat on the foodstuff surface causing the bixin to be adsorbed thereon where it is fixed to the surface of the foodstuff. Transfer and fixing of the bixin to the foodstuff surface may also be assisted by the presence of polyphosphates.

Preferred film forming agents are edible water-soluble cellulose ethers. Suitable cellulose ethers which may be employed are the non-ionic, water-soluble, alkyl and hydroxyalkyl cellulose ethers such as, for example, methylcellulose, hydroxypropyl methylcellulose, hydroxypropylcellulose, ethyl methylcellulose, hydroxyethylcellulose and ethyl hydroxyethylcellulose and the anionic water-soluble cellulose ethers such as, for example, carboxymethylcellulose and carboxymethyl hydroxyethylcellulose. Commercially, carboxymethylcellulose (CMC) and carboxymethylhydroxyethylcellulose are almost always sold as the sodium salt, and it is well established trade practice not to refer to the commercial product as the sodium salt. For the purpose of this application, reference to these anionic materials shall include salts thereof e.g. the sodium salt and other alkali metal salts thereof.

A preferred noncellulosic film forming agent is food grade shellac. Shellac may also be added as a colorant transfer promoter and rub off inhibitor by adding shellac into a colorant composition which already has bixin dispersed in a film forming agent, preferably a water-soluble cellulose ether such as hydroxypropycellulose dissolved in water. Thus, edible shellac may beneficially be added by simple mixing to an existing dispersion of bixin in a film forming agent or bixin may be dispersed by milling into shellac. In either instance it is essential that the bixin be dispersed in at least one film forming agent as specified above.

An especially preferred film forming agent is hydroxypropylcellulose which has been found to work well in holding and transferring bixin from casing to sausage. Beneficially, food grade hydroxypropylcellulose is commercially available from Aqualon Company of Wilmington, Del. under the trademark KLUCEL. A preferred type of hydroxypropylcellulose is available under the trademark KLUCEL LF and has a reported molecular weight of about 95,000, a reported $I_2$ melt index (2160 g load at 180° C.) of 18.63 and which dissolved in water forms a clear solution having an approximately neutral pH. KLUCEL LF hydroxypropylcellulose is a nonionic water-soluble polymer which also soluble in alcohols such as ethanol. KLUCEL hydroxypropylcellulose is a known film former which has been suggested as useful in printing inks as a thickener, binder or suspending agent and as a soluble, edible, flexible film barrier for fast release in encapsulation uses. It has also been purportedly used in food as a stabilizer, binder, high gloss and color coating, oil barrier and protective coating. Other purported uses include the areas of adhesives, aerosols, cosmetics, plastic molding, paper coatings, paint removers, pharmaceutical binders, and in plastic foams among other applications. Its properties are further described in a 27 page brochure entitled "KLUCEL® Hydroxypropylcellulose/A Nonionic Water-soluble Polymer/Physical and Chemical Properties Rev. 10/87 " (1987, Aqualon Company, Wilmington, Del., U.S.A.) which brochure is hereby incorporated by reference in its entirety.

The amount of water-soluble film forming agent present on the internal surface of the food casing, which is necessary to impart desired film forming and colorant transfer and release characteristics, can vary over a wide range. Also, mixtures of different film forming agents may be used.

An optional additional component of the coating composition is a polyphosphate, such as an alkali metal polyphosphate, preferably tri- and longer chain polyphosphates such as potassium or sodium tripolyphosphate. An especially preferred polyphosphate is available from BK Ladenburg Corp. of Cresskill, N.J. under the trademark BRIFISOL® 512 as a food grade blend of polyphosphates which is believed to contain sodium tripolyphosphate. The polyphosphate may promote color transfer from the casing to the sausage surface and binding on the sausage surface by causing expansion of protein chains on the sausage surface thereby allowing pigment to be carried into the expanded structure. The polyphosphate may be multifunctional and act as a color enhancer, buffer, stabilizer, binding agent and transfer agent.

Beneficially, an optional additional component will be an anti-oxidant color stabilizer such as a tocopherol, ascorbate, tea extract or other extracts of Labiatae plants such as rosemary, sage or thyme extracts. Vitamin E (tocopherol) is a preferred anti-oxidant which acts to stabilize color intensity. Such stabilization may be more noticeable upon aging of the colorant or colorant coated casing particularly for 4–6 weeks or longer at room temperature (~25° C.). optionally and preferably, drying agents such as alcohol may be added to the bixin containing coloring composition. A preferred drying agent is ethanol. Surprisingly, the presence of an alcohol such as ethanol in the colorant composition has been found to reduce the amount of visible color rub off from products colored with the inventive colorant and casing and also appears to reduce the colored purge which accumulates in vacuum packages of sausages made with the inventive casing and colorant. It is believed that the alcohol promotes improved fixation of the bixin colorant composition on a proteinaceous and fat containing foodstuff.

Also, glycerine and/or oils such as vegetable oil may be added to the bixin dispersion to promote spreading of the colorant composition on the casing surface and enhance uniformity of color transfer to the sausage surface.

The presence of oil in the composition also causes the color to shift from a reddish appearance to a more desirable (for certain frankfurter markets) orangish-yellow. Excessive oil (in some embodiments 10% or greater of the coating composition) may have a deleterious effect on shirred casing stick coherency. Preferably oil or fat is present in the colorant composition in an amount less than 10% by weight, and more preferably in an amount less than 8%, most preferably in an amount of at least 1% to about 5%.

When the colorant coating composition is applied to casings which are coated with typical commercially used shirring solution and peeling aid compositions, a combination of coating ingredients may be applied simultaneously or sequentially.

Also, surfactants such as lecithin, polysorbates including polyoxyethylene (20) sorbitan monolaurate e.g. sold under the trademark Tween 20 from ICI Americas Inc. of Wilmington, Del., U.S.A. or ethyoxylated monodiglycerides e.g. sold under the trademark Mazol 80 MG K by Mazer Chemicals, Inc. of Gurnee, Ill., U.S.A. may be employed to facilitate uniformity, spreadability, and/or transferability of the bixin coloring composition from the casing to the encased foodstuff.

The amount of coating composition applied to the casing will typically be from 3–6 mg. coating per $in^2$ of coated casing surface. The coatings may be applied during shirring as a spray. Alternatively, bixin containing coatings may be applied to gel stock casing by slugging prior to drying, or by slugging semi-finished casing after drying and prior to shirring. Uniformity of the coating on the casing may be enhanced by slugging or a combination of slugging and addition during shirring by spray.

Also, bixin containing coatings may be applied to dissolved cellulose or a cellulose derivative prior to tube formation e.g. in viscose in order to produce colored casing. Although it is expected that some bixin would be entrapped within the casing and not transfer, it is also believed that bixin located on the surface of the casing would transfer during processing to a protein and fat containing foodstuff surface held in contact with the casing surface under elevated temperature.

For the inventive self coloring casing the amount of bixin present on the internal surface of the casing, which is necessary to impart a desirable color, can vary over a wide range. In general, tubular casings of the present invention will contain sufficient bixin to color the sausage surface uniformly and to a visually perceptible color intensity. Such intensity will vary according to customer tastes in the marketplace. Suitable amounts of bixin range from 0.10 to about 0.5 mg/in$^2$ (0.016–0.078 mg/cm$^2$) of casing (food contact surface). Lesser amounts of bixin will have a decreased color intensity. Use of amounts greater than 0.5 mg/in$^2$, while believed to be workable, may be uneconomical due to the expense of the bixin which is a natural dye pigment colorant extracted from annatto tree seeds and surrounding pulp. Also, high amounts of bixin may produce a product having an undesirably intense color shade (e.g. undesirably red for a particular product application), or an undesirably high propensity for the bixin colorant to come off the sausage surface and transfer to the purged liquid found in the vacuum packages, or to come off onto a consumer's hands during handling of the sausages after opening the package. Generally, colorant compositions made according to the present invention will have typical amounts of bixin in the range of about 1–8 weight percent with a preferred composition of the invention having at least 2.5 weight present bixin and less than about 8 wt. %.

In some embodiments of the invention food casing will be coated with the inventive colorant composition in an amount sufficient to produce a casing having L,a,b values of

55<L<70

15<a<25

25<b<30.

Also, encased frankfurters may be produced with the inventive casing which have L,a,b values of 40<L<60 more preferably 44<L<48

30<a<40 more preferably 36<a<39

20<b<30 more preferably 26<b<29.

Beneficially, peeled frankfurters having a desirable color may be produced using the inventive casing without any additional dipping or coating step to produce peeled frankfurters having L,a,b values of 45<L<55 more preferably 50<L<55

25<a<35 more preferably 26<a<29

20<b<30 more preferably 27<b<30.

The amount of film forming agent may also vary widely. Typical amounts of such agent may range from less than 0.1 to more than 0.5 mg/in$^2$ of casing surface (food contact surface). Too little of the agent will not provide the desired effect, while too much may not provide any additional benefits commensurate with the added material cost. There should be enough film forming agent to resinate or disperse the bixin particles into a fine grind. Typical amounts of any preferring film former of hydroxypropylcellulose may range from 2–6% of the total colorant composition with from about 5 to 100% of the film former being milled with the bixin. Preferably the colorant composition will contain an equal or greater total amount of film forming agent relative to the amount of bixin and such total amount will include film forming agent which has been milled with bixin plus any film forming which has been added without milling.

The amount of the polyphosphate may also vary widely. Typical amounts of polyphosphates or blends thereof may range from 0.01 to 0.10 mg/in$^2$ of casing surface (i.e. the casing surface intended for food contact).

The anti-oxidant/color stabilizer may be used in an amount effective to promote layer color transfer and/or prevent or lessen any decrease in color intensity over time. Amounts from less than about 0.01 to more than 0.1 mg/in$^2$ of casing surface (food contact surface) are believed to be suitable.

Drying agents such as alcohols may be present in widely varying amounts, e.g. up to 60% by weight of the colorant coating composition. These agents generally assist evaporation of water from the casing during drying and prior to shirring. They also have unexpectedly been discovered to lessen production of an undesirably colored purge when the composition is used to color a foodstuff surface such as for frankfurters which foodstuff is subsequently repackaged. These agents also unexpectedly reduce transfer of the bixin colorant from a coated processed food product such as a frankfurter to a person's hands during handling of the sausages prior to consumption.

Glycerine may also be present in widely varying amounts. Glycerine is typically added to casing to promote plasticization and such amounts may be adjusted to maintain present composition levels in ready to stuff casing if desired. Glycerine may be provided in the coloring composition in an amount from 0 to 5% or more based upon the weight of the colorant coating composition.

Surfactants, such as a phospholipid e.g. in the form of lecithin, may also act as color stabilizers and promote uniformity of the color transfer. Such surfactants may be present in the bixin color coating composition in amounts from 0 to 1% by weight or more based upon the weight of the colorant coating composition.

Beneficially, a surfactant/emulsifier component of the inventive coating composition according to present invention may be lecithin. Lecithin is a mixture of diglycerides of stearic, palmitic and oleic acids, linked to the choline ester of phosphoric acid. Most commercial lecithin is a mixture of naturally occurring phospholipids which are derived from soybeans. Typical soybean lecithin comprises the following acids with approximate percentages: palmitic (12%), stearic (4%), palmitoleic (9%); oleic (10%), linoleic (55%) linolenic (4%) and $C_{20}$ to $C_{22}$ acids including arachidonic (6%). Lecithin is also an anti-pleat lock agent which may also act as a surfactant with both wetting and emulsifying properties. It may also promote peelability of the casing. Lecithin is known to function as a release aid, dispersant, lubricant, softener and to control viscosity in various food industry applications. Lecithin is an amphoteric emulsifier. As used herein, the term "lecithin" includes both unsubstituted lecithin and substituted lecithin which has been modified by chemical means. Suitable lecithin is commercially available from Central Soya Co., Inc. of Fort Wayne, Ind. under the brand designation Centrolex-P 6420. Centrolex-P 6420 is commercially available as a food grade, essentially oil-free, water dispersible and oil soluble granular soybean-derived lecithin having a minimum of about 97% of acetone insoluble phospholipids.

Since lecithin may be utilized in the present invention as an anti-pleat lock agent or possibly to enhance or potentiate a peeling aid as well as an emulsifier, the amount of lecithin present on the internal surface of the casing may vary over a wide range.

Other surfactants suitable for use in the coating compositions of the present invention include those surfactants which act as wetting agents for the cellulosic casing surface and/or as emulsifying agents for the coating composition. This may also include peeling aids, or shirring lubricants. Advantageously, the surfactant facilitates spreading of the coating composition across the surface of the casing which is preferably cellulosic casing. Nonlimiting examples of suitable surfactants include water dispersible or at least partially water-soluble surfactants such as alkylene oxide adducts of either fatty acids or partial fatty acid esters, for example, ethoxylated fatty acid partial esters of such polyols as anhydrosorbitols, glycerol, polyglycerol, pentaerythritol, and glucosides, as well as ethoxylated monodiglycerides, sorbitan trioleate, lecithin, and aliphatic polyoxyethylene ethers such as polyoxyethylene (23) lauryl ether.

Preferred surfactants include polyoxyethylene sorbitan fatty acid esters or mixtures thereof such as those sold under the trademark Tween such as Tween 20 (polyoxyethylene (20) sorbitan monolaurate) or Tween 80 (polyoxyethylene 20 sorbitan monooleate) (both commercially available from ICI Americas Inc. of Wilmington, Del.), ethoxylated monodiglycerides or mixtures thereof such as those sold under the trademark Mazol 80 MG K (commercially available from Mazer Chemical, Inc. of Gurnee, Ill.), sorbitan trioleate (commercially available from ICI Americas Inc. under the trademark Span 85), and phosphalipids including lecithin. An especially preferred surfactant is a mixture of ethoxylated monodiglycerides such as Mazol 80 MG K. Some surfactants are also known to act as anti-pleat lock agents e.g. lecithin and Tween 80.

Suitable amounts of a surfactant, such as a mixture of ethoxylated monodiglycerides (Mazol 80), may be present on the inner surface of the casing in order to wet the casing surface and assist in dispersing the anti-pleat lock agent, especially oils, and to emulsify and/or stabilize peeling aid compositions which contain components of varying solubilities. Desirably, amounts of a surfactant may range from about 0.005 to about 0.06 mg/in$^2$ (0.0008–0.0009 mg/cm$^2$) and preferably for a surfactant of ethoxylated monodiglycerides such as Mazol 80 from about 0.01 to 0.02 mg/in$^2$ (0.002–0.003 mg/cm$^2$). Too little surfactant may lead to an uneven distribution of the coating composition on the casing surface and with increased surfactant any additional benefits are believed to be reduced in significance relative to the added cost or possible deleterious effect on shirred stick properties such as coherency, deshirring forces and straightness of the shirred stick.

A number of factors are known to affect the preparation of shirred casing sticks and the suitability of shirred casing sticks for use in the processing of various types of food products, particularly when high speed automatic equipment is employed in the shirring and stuffing operations. For example, when water is applied to the casing during the shirring process, it is known that take up by the casing of excessive amounts of water may cause the casing to seize on the shirring mandrel making further processing thereof very difficult, if not impossible. Also, addition of excessive water may cause swelling of the shirred casing leading to "growth" of the shirred stick particularly in length which may form nonuniform shirred sticks of varying length or straightness. However, addition of water does have the benefit of acting as a plasticizer which may facilitate the shirring operation. Accordingly, when it is desired to apply the bixin containing coating compositions described herein, for example, while the tubular casing is passing over a shirring mandrel just prior to or during the shirring operation, the amount of total coating compositions (including any peeling aid composition, or components added to assist in shirring or for other reasons) applied while treating the internal surface of the casing with a bixin colorant composition is controlled to limit the amount of water added to the casing. Likewise addition of other chemical components may so be controlled.

It is advantageous to avoid application of more coating composition than can be imbibed by the casing in order to prevent excess coating composition from being lost and wasted or from accumulating in localized areas of the shirred sticks with resulting detrimental effects thereto. Generally, not more than about 6 mg/in$^2$ (0.93 mg/cm$^2$) and preferably not more than about 5 mg/in$^2$ (0.78 mg/cm$^2$) of total aqueous based coatings should be applied to the internal surface of the tubular casing. The application of the total coating compositions should be further controlled so that less than about 5 mg/in$^2$ (0.78 mg/cm$^2$) of water is applied to the surface of the casing. Cellulose casing after shirring should have a suitable moisture content of about 25 to 50 percent by weight based upon bone dry cellulose and preferably about 30 to 40% for small diameter cellulosic casing. Casing brittleness increases with decreasing moisture content and the tendency to produce curved, nonuniform and/or swollen shirred sticks subject to post-shirring elongation increases with higher moisture levels.

Preferably thermoplastic casing or casing in which the colorant composition is coated on a thermoplastic layer will have less than 6 mg/in$^2$ (0.93 mg/cm$^2$) of colorant coating on the food contact surface of the casing.

Another factor known to be especially important in affecting the suitability of shirred casing sticks for use with automatic food stuffing equipment, for example employed in the preparation of products such as frankfurters, is the durability or coherency of the shirred stick as a self-sustaining article. A disjunction or break in the shirred stick prior to mounting on the stuffing apparatus may make the stick unsuitable for use. Accordingly, any treatment such as the application of a coating to a tubular food casing that is to be formed into shirred casing sticks must be considered in light of its effect on coherency. Advantageously, such coatings will assist in formation of shirred sticks of casing which have sufficient coherency to hold together from immediately after shirring through shipping and ultimate use, while allowing the shirred casing to be easily deshirred during stuffing operations without production of casing defects such as holes or tearing and without requiring undue force thereby minimizing such defects.

If desired, casings of the invention may also optionally be treated with acidic or neutralized, concentrated, tar-depleted liquid smoke (See e.g. U.S. Pat. Nos. 4,356,218, 4,511,613, 4,540,613 and 4,818,551) to provide a smoke color and flavor transferable casing and may also be treated with phosphates to inhibit discoloration and black spot formation on the casing as disclosed in the above patents.

The following test methods are referred to in this application and examples.

L,a,b Test

Hunter L,a,b values are standard color scale values which indicate differences in brightness, hue and saturation using a standard color system which relates lightness as L values, and hue and croma as a combination of a and b values on a coordinate scale where a represents redness-greenness and b represents yellowness-blueness. L,a,b and opacity theory and measurement are further described in the Instruction Manual Hunter Lab 45°/0° D25-PC2Δ Colorimeter, pp. 1—1 through index-5. (Hunter Associates Laboratory, Inc., April, 1988) which is hereby incorporated by reference. Hunter L,a,b and color scale values and opacity may be measured by the following tests.

Encased or peeled frankfurters may be tested as is. Casing samples to be tested are preferably flat roll stock having smooth planar surfaces which casing has not been shirred because wrinkles may affect test values.

L,a,b values and opacity are measured using a calorimeter such as a Hunter D25-PC2Δ colorimeter available from Hunter Associate Laboratory, Inc. of Reston, Va., U.S.A. or the Color Machine Model 8900 available from Pacific Scientific.

Samples are placed on the sample plane of the calorimeter (which is calibrated using standard tiles according to the manufacturer's instructions) where a 45° incident light from a quartz-halogen lamp (clear bulb) illuminates the sample. An optical sensor placed at 0° (perpendicular to the sample plane) measures the reflected light which is filtered to closely approximate CIE 2° Standard Observer for Illuminant C. Values are reported using a standard Hunter L,a,b color scale.

Casing sample placement is accomplished as follows. A tubular casing sample is cut open (opposite the seam if any) in the longitudinal direction to form a film having a single thickness. The casing sample is placed on the white tile provided for measuring samples, taking care to avoid locating any seams or folds in the sampling area. The casing and tile are then held in close contact against the sample port which is equipped with a sample port insert having an appropriately sized aperture. The aperture should be no larger than the area to be sampled. The casing is placed with the axis of the longitudinal direction (machine direction) perpendicular to the path of the incident light travelling to the sample from the quartz-halogen lamp light source. The cut casing is generally positioned so that the former exterior surface of the tube is adjacent to the sample port. Alignment of the casing sample is checked to avoid dryer folds and obvious defects L,a,b values are measured. The casing sample is then repositioned to a different area of the casing sample and L,a,b values are measured again (taking care to avoid seams and folds). The repositioning and remeasuring is repeated to obtain four sets of values which are averaged.

Measurements of L,a,b values for frankfurters are similarly performed except the frankfurter, either encased or peeled, is held directly against the port opening (which is typically a circular opening about ½ inch in diameter) and it is not necessary to use a tile background during measurement. Three measurements per frankfurter are made and five frankfurters are tested.

Melt Index (MI)

ASTM D-1238, Condition E. Measured at 190° C. and reported as grams per 10 minutes.

Fineness of Grind

ASTM D-1316-87

The invention will become more clear when considered together with the following examples which are set forth as being merely illustrative of the invention and which are not intended, in any manner, to be limitative thereof. Unless otherwise indicated, all parts and percentages are by weight.

Formulary Example

Various annatto coloring compositions were prepared as follows.

Bixin Mixture (Not of the Invention)

Hydroxypropylcellulose sold under the trademark Klucel LF by Aqualon Company of Wilmington, Del., U.S.A. was mixed at room temperature with moderate stirring into a solution containing 1 part deionized water and 1 part ethanol (EtOH) until dissolved forming a solution containing 9.0 weight percent of hydroxypropylcellulose (HPC). This mixture is hereinafter termed the "HPC-$H_2O$—EtOH α solution". Crystalline bixin powder was added with glycerine and a 15% by weight mixture of a sodium polyphosphate in deionized water to the HPC—$H_2O$—EtOH solution. The bixin was added without milling and therefore was not dispersed into the hydroxypropylcellulose. In other words simple mixing of the ingredients was performed without making a uniform dispersion having individual particles of bixin resinated or coated with the film forming agent. The sodium polyphosphate was in the form of a food grade blend sold under the trademark Brifisol® 512 by BK-Ladenberg Corp. of Cresskill, N.J., U.S.A. This resultant mixture containing 5.9% bixin, 7.65% Klucel LF (hydroxypropylcellulose), 0.6% Brifisol 512 (polyphosphate), 4.4% glycerine, 39% ethanol and water had a pH of 6.2 and is hereinafter termed "Bixin Mixture".

Bixin Mixture β (Not of the Invention)

A Bixin Mixture β was made by combining at room temperature with stirring at a moderate rate the following: 68% of "HPC—$H_2O$—EtOH α solution" made as described above for Bixin Mixture α; 4.5% glycerine; 4.5% of a polyphosphate (Brifisil®512); and 23.0% of an oil soluble suspension of bixin (3.8%) in vegetable oil sold under the trademark A-400-S by CHR. Hansen's Laboratory, Inc. of Milwaukee, Wis., U.S.A. Therefore, Bixin Mixture β had a bixin content of 0.87%. The pH was measured at 6.5.

Bixin Mixture γ (Not of the Invention)

A Bixin Mixture γ was made as above for Bixin Mixture β except only 20% of the oil-soluble bixin suspension was used and 3% of crystalline bixin powder having about 92% bixin (remainder inert material) was added by simple mixing at a moderate rate. Therefore, bixin mixture γ has a bixin content of about 3.52%.

Bixin Mixture δ (Not of the Invention)

Hydroxypropylcellulose (Klucel LF) was mixed at room temperature with moderate stirring into deionized water to form a 3.0 weight % solution of hydroxypropylcellulose (HPC) in water. Bixin Mixture δ was made by mixing 60.5% of the 3% HPC aqueous solution; 4.5% glycerine; 4.5% of a polyphosphate (Brifisil® 512); 0.5% of Vitamin E; and 30.0% of an oil-soluble suspension of bixin (3.8%) in vegetable oil (A-400-S). Thus, Bixin Mixture δ had a bixin content of 1.14% bixin.

Norbixin Mixture ε (Not of the Invention)

15 parts of a water soluble powdered annatto food color in the form of 15 weight percent norbixin in a base of potassium carbonate and KOH was mixed with stirring with 85 parts of a triple strength water soluble Annatto Food Color in the form of a solution of 3.8 weight percent norbixin in an aqueous solution of KOH with castor oil (both annatto colorants available from CHR. Hansen's Laboratory, Inc. of Milwaukee, Wis., U.S.A.). The mixture of these two annatto colorants formed an alkaline aqueous solution containing 5.5% norbixin.

A norbixin mixture $\epsilon$ was made by combining with stirring 52 weight percent of the above norbixin solution with 37.7% of a 5.0% mixture of KLUCEL LF (hydroxypropylcellulose) in ethanol, 0.3% of Tween 20 (a surfactant), 5.0% of glycerine, and 5.0% of a 15.0% solution of Brifisol 512 or deionized water. The resultant Norbixin Mixture $\epsilon$ contained about 2.86% norbixin.

Bixin Mixture A

Hydroxypropylcellulose (Klucel LF) was mixed into a solution containing 1 part deionized water and 3 parts ethanol (EtOH) to form a solution containing 7 weight percent of hydroxypropylcellulose (HPC). This mixture is hereinafter termed the "HPC—$H_2O$—EtOH A solution". Crystalline bixin which had been milled to a fine powder was dispersed in the HPC—$H_2O$—EtOH A solution in an amount of 20 percent by weight of the resultant mixture. This novel resultant mixture containing bixin, hydroxypropylcellulose, water and ethanol is hereinafter termed "Bixin Mixture A".

Bixin Mixture B

Another mixture was made as described above except deionized water was used instead of ethanol. Thus, a 7 weight percent solution of hydroxypropylcellulose (HPC) in water was made and 20 percent by weight of bixin was added to the aqueous HPC solution. This bixin, hydroxypropylcellulose, and water mixture is hereinafter termed "Bixin Mixture B".

Bixin Mixture 1A

A 117 parts by weight mixture was formed in which Bixin Mixture A (14 parts) was added to 84 parts of the HPC—$H_2O$—EtOH A solution, as was 4.5 parts of a 15 weight percent solution of a blend of polyphosphates (Brifisol 512) in deionized water, 4.5 parts glycerine, and 10 parts of a 3.8% suspension of bixin in oil (A-400-S). This entire mixture was blended to uniformly disperse or dissolve the components of the mixture and create a novel coloring composition (hereinafter designated 1A). Bixin Mixture 1A contained about 2.7% bixin.

Bixin Mixture 1B

A 100 parts by weight mixture was formed in which Bixin Mixture B (14 parts) was added to 75 parts of a 3 weight percent solution of hydroxypropylcellulose (Klucel LF) in deionized water, as was 4.0 parts of a 15 weight percent solution of a blend of polyphosphates (Brifisol 512) in deionized water, 4.0 parts glycerine, 2 parts of a 3.8% suspension of bixin in oil (A-400-S), 0.5 parts of Vitamin E (tocopherol), and 0.5 parts of a surfactant (Tween 20). This entire mixture was blended to uniformly disperse or dissolve the components of the mixture and create a novel coloring composition 1B containing about 2.88% bixin.

Bixin Mixture 1C

A 100 parts by weight mixture was formed in which Bixin Mixture A (40.0 parts) was added to 46 parts of deionized water, as was 4.0 parts of a 15 weight percent solution of a blend of polyphosphates (Brifisol 512) in deionized water, 4.0 parts glycerine, 5.0 parts of a 3.8% suspension of bixin in oil (A-400-S), 0.5 parts of Vitamin E (tocopherol), and 0.5 parts of a surfactant (Tween 20). This entire mixture was blended to uniformly disperse or dissolve the components of the mixture and create a novel coloring composition 1C containing about 8.19% bixin.

Bixin Mixture 1D

A Bixin Mixture 1D was made as described above for Bixin Mixture 1C except only 2.0% of the oil-soluble bixin suspension (A-400-S) was used and 49.0% water was added. Bixin Mixture 1D contained about 8.08% bixin.

Bixin Mixture 1E

A Bixin Mixture 1E was made as described above for Bixin Mixture 1C except 10.0% of the oil-soluble bixin suspension (A-400-S) was used and only 41.0% water was added. Therefore, this mixture contained about 8.38% bixin and less than 10.0% oil.

Bixin Mixture 1F

A Bixin Mixture 1F was made as described above for Bixin Mixture 1A except a 100 parts mixture was formed by reducing the amount of Bixin Mixture A to 7.0 parts and eliminating addition of the bixin suspension (A-400-S). Therefore, the novel Bixin Mixture 1F contained no oil and all bixin (1.4%) was dispersed in the hydroxyporpylcellulose.

Bixin Mixture 1G

A Bixin Mixture 1G was made as described above for Bixin Mixture 1F except an additional 7.0 parts of Bixin Mixture A was added to produce a composition which contained about 2.8% Bixin Mixture A.

Bixin Mixture 1H

A Bixin Mixture 1H was made as described above for Bixin Mixture 1F except an additional 5.0 parts of a 3.8% suspension of bixin in vegetable oil (A-400-S) was added to produce mixture 1H which contained 1.59% bixin.

EXAMPLE 1 (Not of the Invention)

Norbixin coated sausage casings (III) were made using Norbixin Mixture $\epsilon$ and compared to a prior art bixin coated self coloring sausage casing (II) and a commercial clear control casing (I). The clear control casing (I) was a small diameter cellulose casing having a peeling aid which is marketed under the trademark E-Z PEEL NOJAX® Casing by Viskase Corporation. The prior art bixin coated self-coloring casing (II) was marketed by Hoechst/Trificel S. A.

Commercially produced, nonfibrous, small diameter casings of regenerated cellulose made from viscose were used to prepare the norbixin coated casings (III) of these examples. The norbixin casings (III) were coated by vertical slugging with the norbixin containing colorant made according to Norbixin Mixture $\epsilon$ of the Formulary Example and dried.

In order to determine the color produced on food surfaces one shirred stick of each casing type was used to make frankfurters. Each casing of Examples I,II and III was stuffed with a high collagen frankfurter emulsion, thermally processed and refrigerated overnight before evaluation of color.

The color of both encased and peeled frankfurters was evaluated visually and colormetrically for frankfurters made with the above three types of casing. The transfer of bixin colorant coating to the frankfurter surface was judged to be more complete than the transfer of the norbixin E coating (III). L,a,b Hunter calorimeter scale values of the frankfurter surface were measured for the above examples with the casing on (encased) and with the casing removed (peeled). These values are reported in Table 1 along with values measured for similarly processed frankfurters made using a prior art casing sold by Trificel S. A. and which is believed to have a bixin colorant. An average of 15 readings are reported with the standard deviation ($\sigma$).

TABLE 1

| Casing Type | L | σ | a | σ | b | σ |
|---|---|---|---|---|---|---|
| I Clear*† | 48.37 | 0.99 | 17.14 | 0.64 | 15.60 | 0.45 |
| II Trificel**† | 39.90 | 0.76 | 34.15 | 0.95 | 22.79 | 0.37 |
| III Norbixin ε† | 37.44 | 0.65 | 36.77 | 1.12 | 22.90 | 1.20 |
| I Clear*†† | 50.38 | 1.04 | 15.86 | 0.42 | 15.19 | 0.35 |
| II Trificel**†† | 45.46 | 0.87 | 24.11 | 1.04 | 22.42 | 0.63 |
| III Norbixin ε†† | 46.82 | 1.19 | 18.86 | 0.49 | 20.54 | 0.67 |

*Commercially made clear, uncolored E-Z PEEL NOJAX ® cellulose casing.
**Commercially made shirred Hoechst/Trificel ® casing having an internal annatto colorant.
† Values measured are of the encased frankfurter surface.
†† Values measured are of the peeled (casing removed) frankfurter surface.
σ Standard deviation.
L Values described darkness, L of 100 = white, L of 0 = Black.
a Values describe degree of redness; redness increases with larger a values.
b Values describe degree of yellowness; yellowness increases with larger b values.

The clear control I (E-Z PEEL NOJAX casing) produced frankfurters which were visually judged to be light pink in appearance with no visible pleat marks or longitudinal lines. The prior art bixin coated casing II exhibited slight pleat marks on the finished frankfurter. The norbixin coated casing III had slightly visible longitudinal lines and produced an encased product that was visually judged to be darker and more yellowish brown than the frankfurters made with the Trificel Casing II. Colorimetric analysis showed lower L values and higher a values for the norbixin encased product relative to the Trificel casing II. II and III had similar b values. The L,a,b values indicated that casing III had a slightly darker, and redder encased product with a comparable degree of redness relative to encased product II. Both the Trificel II and norbixin III encased frankfurters were noticeably colored relative to the clear control sample I made with a nonself-coloring casing having a relatively colorless peeling and shirring aid coating composition. The casing of II and III was also noticeably colored prior to stuffing. The encased processed frankfurters were hand peeled and it was observed that the peeled norbixin casing was noticeably darker than the peeled Trificel casing (II). Of the finished peeled frankfurter products, the peeled sausages made with the norbixin casing III were visually observed to be slightly lighter but "smokier" in color than the peeled sausages made with the self-coloring Trificel casing II. The L,a,b values of the peeled frankfurter show that the peeled frankfurters made with the norbixin coated casings III were noticeably whiter, less red and less yellow than either the encased frankfurter or the peeled frankfurter made with Trificel casing II. These results demonstrate that the norbixin coating has an undesirable affinity for cellulose which hinders the transfer of the norbixin colorant from a so-coated cellulose casing to proteinaceous and fat containing foodstuffs such as frankfurters. This test was conducted using casing that had been coated with norbixin about one week prior to stuffing, cooking, peeling and color evaluating. It is further believed that norbixin over longer periods of time becomes less transferable from the cellulose thereby making norbixin coated cellulose packaging film undesirably short lived for use as self-coloring packaging.

EXAMPLE 2 (Not of the Invention)

Commercially produced, nonfibrous, small diameter casings of regenerated cellulose made from viscose were used to prepare casings of these examples. The casings were coated by horizontal slugging with the bixin containing colorant made according to the Formulary Example Bixin Mixture α and dried.

In order to determine the color produced on food surfaces the casing was used to make frankfurters. The casing was hand stuffed and string tied with an all pork frankfurter emulsion. The encased frankfurters were cooked at 40% relative humidity without smoke, cold water showered and refrigerated at 40° F. overnight before evaluation of color. The casing coated with Bixin mixture a was evaluated as transferring to the frankfurter surface to a moderate extent and as having an undesirable brown-green-orange color with dark pigment particles. The overall appearance was evaluated as brownish speckled and sandy relative to similarly made frankfurters using a commercially available clear cellulose casing sold under the trademark NOJAX® by Viskase Corporation. Visible pigment particles on the surface of a frankfurter are a very undesirable defect giving a bad product appearance.

The example above was repeated twice using Bixin Mixture β and Bixin Mixture γ, respectively, as coatings instead of Bixin Mixture α. The casings having Bixin mixtures β and γ had a desirably more orangish color than the casing coated with Bixin mixture α. The γ coated casing was slightly darker and had a more reddish orange color than the β mixture coated casing. However, the γ coating also undesirably had visible pigment particles. L,a,b Hunter colorimeter scale values of the frankfurter surface were measured for the above examples with the casing on (encased) and with the casing removed (peeled). These values are reported in Table 2 along with values measured for similarly processed frankfurters made using a prior art casing sold by Trificel S. A. and which is believed to have a bixin colorant. An average of 15 readings are reported with the standard deviation (σ).

TABLE 2

| | L | σ | a | σ | b | σ |
|---|---|---|---|---|---|---|
| 2 α† | 45.86 | 1.00 | 16.15 | 0.72 | 21.97 | 0.60 |
| 2 β† | 40.11 | 1.09 | 32.61 | 0.91 | 23.24 | 0.49 |
| 2 γ† | 37.94 | 1.10 | 32.48 | 0.93 | 21.78 | 0.64 |
| Clear*† | 55.93 | 0.98 | 10.44 | 0.69 | 13.61 | 0.66 |
| Trificel**† | 45.93 | 1.13 | 27.16 | 0.74 | 26.21 | 0.50 |
| 2 α†† | 48.09 | 0.73 | 14.06 | 0.80 | 21.36 | 0.62 |
| 2 β†† | 45.02 | 1.01 | 27.55 | 1.61 | 24.84 | 0.55 |
| 2 γ†† | 41.96 | 1.95 | 29.53 | 2.53 | 24.04 | 0.97 |
| Clear*†† | 57.97 | 0.76 | 9.93 | 0.87 | 13.02 | 0.51 |
| Trificel**†† | 51.95 | 0.80 | 18.73 | 0.93 | 26.38 | 0.78 |

*Commercially made clear, uncolored NOJAX ® cellulose casing.
**Commercially made shirred Trificel ® casing having an internal annatto colorant.
† Values measured are of the encased frankfurter surface.
†† Values measured are of the peeled (casing removed) frankfurter surface.
σ Standard deviation.

The above examples β and γ both contained excessively high amounts of oil (22% and 19% respectively) which negatively impacted the coherency of the shirred sticks which needed substantial support and careful handling to avoid breakage.

EXAMPLES 3–8

Commercially produced nonfibrous casings of regenerated cellulose made via the viscose process were used to prepare the casings of the Examples 4–8 of the invention. The casing of Example 3 (not of the invention) was a commercially available small diameter cellulose sausage casing sold by Trificel S. A. e.g. such as those sold under the trademark TRIP-FORT having an internal peeling aid coating believed to contain a cellulose ether such as carboxymethyl cellulose. The casings of Examples 4–8 were similar to commercially available small diameter, nonfibrous cellulosic sausage casings sold by Viskase Corporation under the trademark NOJAX, except that the casings were modified as explained below with novel coating compositions.

In Example 4, semi-finished reeled casings (i.e. unshirred tubular casing which is converted from gel stock casing by drying, then flattened and wound on a reel) was coated on its interior surface by vertically slug coating a colorant composition made according to the Formulary Example Bixin Mixture 1A. The bixin containing colorant composition which was visibly colored orange red was coated on the casing in an amount providing 0.06 mg of bixin per square inch of casing. This colorant coated casing which was visibly orange red in color was rewound on reels and then was conventionally shirred but with addition of a peeling aid composition during or just prior to shirring by addition of an aqueous peeling aid mixture containing 1.43 weight % of each of the sodium salt of carboxymethylcellulose and mineral oil, and 0.34 weight % of a surfactant by spraying the inner surface of the casing through the shirring mandrel, as the casing is shirred, to deliver 245 mg of peeling aid mixture per 100 square inches of casing inner surface. The shirred casing was packaged in a plastic bag to maintain the casing moisture level.

In Example 5, colorant composition and peeling aid coated casings were made as described above for Example 4, except that colorant composition 1B was used instead of 1A and the 1B composition was applied to the interior casing surface by horizontal slug coating followed by air drying for about 1 minute with about 5 seconds exposure in close proximity to infrared heaters set at about 93° C., prior to rewinding. Spectrographic analysis revealed a bixin loading of 0.39 mg per square inch of casing.

In Example 6, colorant composition and peeling aid coated casings were made as described above for Example 4 except that colorant composition 1C was used instead of 1A and the 1C composition was applied to the interior casing surface in an amount of 360 mg/inch$^2$ via spraying through the shirring mandrel during shirring. No peeling aid composition was added. Spectrographic analysis revealed a bixin loading of 0.31 mg/inch$^2$ of casing.

In Example 7, casings were made as described above in Example 5 except that these casings were made about 5½ weeks before the casings of Example 5. Analysis revealed a bixin loading of 0.23 mg/inch$^2$ of casing.

In Example 8, casings were made as described above in Example 6 except that these casings were made about 6 weeks before the casings of Sample 6. Analysis revealed a bixin loading of 0.36 mg/inch$^2$ of casing.

The shirred coated casings of Examples 4–8 were tested for color transfer to frankfurter surfaces by processing using a commercial stuffer, smoke house and a high speed machine peeler. Example 3 represents a commercial prior art process for making annatto colored sausages. Examples 3–8 were tested over a two day period. The casings of Examples 4, 5 and 6 were tested between 2 to 20 days after coating with colorant composition. Whereas the casing of Examples 7 and 8 were tested about 6 and 7 weeks, respectively, after coating.

A frankfurter-type meat emulsion prepared from a formulation containing beef, chicken and pork trimmings and soy protein and having a combined protein and fat content of about 31.5% was stuffed into shirred lengths of casing, linked into frankfurters, and cooked in a smokehouse using conventional procedures and equipment. During cooking, gaseous wood smoke was added. Stuffing was performed on a Frank-a-Matic brand stuffer (available from Townsend Engineering Company of Des Moines, Iowa). Generally the processing cycle used consisted of an approximately 45 minute period during which time the temperature of the smokehouse was increased to about 140° F. (60° C.) without humidity control. During this 45 minute period gaseous wood smoke was admitted to the smokehouse for about 20 minutes and smokehouse dampers were open. The dampers were then closed and the temperature of the smokehouse was increased to about 70° C. for about 10 minutes and then steam was added to bring the smokehouse temperature up to about 80° C. until the internal temperature of the test samples of the encased frankfurters reached 73–77° C. (about 15 minutes) at which time the cooked encased frankfurters were removed from the cookhouse and placed in an enclosure where they were showered with tap water for 30 about minutes. The cooked, showered and cooled frankfurters were removed from the shower, placed in a tray with water and then fed into a Ranger Apollo brand peeler (available from Townsend Engineering Company of Des Moines, Iowa) for high speed machine removal of the casing from the cooked foodstuff.

All of the casings of Examples 3–8 stuffed well to a stuffing diameter of 21.5 mm without breakage. The stick coherency of the casing of Examples 4, 5 and 6 was very poor, but Example 7 was acceptable relative to the control Example 3.

After stuffing, but before cooking, the casing of Examples 4, 5 and 7 were visually adjudged to have uniform coatings of colorant. The casing of Example 3 did not contain any colorant. Also before cooking, the casings of Examples 6 and 8 were judged to have a nonuniform coating which showed clearly the shirring produced pleat pattern. However, after processing (smoking and cooking), Examples 6 and 8 were judged to have surprisingly good uniformity of colorant coating although not as good as casings of Example 4, 5 and 7. Example 4 was judged to have both the best uniformity of color and best hue relative to the control.

In the comparative Example 3, the uncolored cooked sausages were colored according to existing commercial practice in which the cooled (about 10° C.) and peeled sausages were placed or dipped in a vessel containing an aqueous solution of norbixin at elevated temperatures (~50° C.) for approximately 5–20 minutes. Following contact with this colorant, the sausages were transferred to a vessel containing phosphoric acid (about 2% acid in water) for less than a minute. Here in the acid vessel the norbixin was acidified and converted to an insoluble form to fix the colorant on the proteinaceous and fat containing surface of the sausage. These color fixed sausages were uniformly orange in appearance. They were drained, vacuum packaged in thermoplastic film and then pasteurized for one hour at about 73° C. The pasteurized, vacuum packaged, annatto colored frankfurters were then chilled at 0° C. for about 20 minutes, and then either frozen or refrigerated until sale or use by a consumer. The chilled and pasteurized vacuum packaged frankfurters contained a small amount of liquid which had a light orangish tint. This liquid is often referred to in the trade as "purge". The orange color intensity and uniformity of coloration on individual frankfurter surfaces was very good and considered typical for commercial products. The "rub off" tendency of the colorant to come off the frankfurter and onto a person's hands when the vacuum package is opened was low which is typical for commercial products.

In Examples 4–8 of the invention, the cooled and peeled frankfurters omitted the annatto dipping step and the phosphoric acid contact step used in the commercial process of Example 3 and the cooled, peeled frankfurters went directly from the peeler to the vacuum packaging. Furthermore, a further advantage of the invention is that use of the inventive casings may optionally allow the vacuum packaged frankfurters to omit the post-vacuum packaging pasteurization step and chilling step. These steps may be omitted because the cooled, peeled frankfurters were not reheated as is required in the annatto and phosphoric acid dip steps of the prior art commercial process. This reheating has a detrimental effect on shelf life. Omission of these reheating steps is believed to provide a longer shelf life. Shelf life is the period of time a product remains fit for sale or consumption under normal industry refrigerated storage conditions without substantial risk of food spoilage caused by bacterial growth or chemical reactions causing undesirable organoleptic defects. In Examples 4–8, the post vacuum packaging pasteurization step was employed, and an additional improvement in color uniformity on the frankfurter surface was noted.

The color of Example 4 was judged to be an excellent match of present commercial products and also evaluated as having excellent uniformity over the frankfurter surface with slight rub off and purge color.

In Example 5 the color hue was judged to be dark and red relative to Example 3 (Example 3 is representative of a commercially acceptable product). Uniformity of coloration on the frankfurter surface was excellent, but rub off was heavy and there was a more noticeable purge.

Example 7 was casing coated with a formula similar to Example 5, but this casing was aged as noted above. The aged casing of Example 7 had a slightly lighter color than the casing of Example 5, but the color was dark and red relative to Example 3. Uniformity of coloration was excellent and there was a medium amount of color rub off, showing an improvement in this characteristic relative to Example 5. The purge was evaluated to be about the same as for Example 5.

Example 6 had a red color hue relative to the orange of Example 3. Uniformity of color was evaluated as poor because of a barely visible pleat pattern. The rub off and purge were evaluated as being greater than for Examples 3 and 4.

The casing of Example 8 had similar results to those of Example 6 although the red hue was slightly lighter.

It is believed that the above noted pleat pattern corresponds to shirring folds and was produced by increased migration of the color composition to these folds after the colorant was applied to the casing as it was being shirred. Comparison of Examples 4–8 indicated that the pleat pattern was not readily evident in the casings which were slugged with a coating and then dried prior to shirring.

The above test of casings in Examples 3–8 was repeated on the following day using a slightly different sausage emulsion. About ½ of the test sausages produced for each of Examples 4–8 were dipped in 2% phosphoric acid solution for about 2 minutes. No significant differences were seen on the second day's tests from the above results. Neither the acid dip nor the slightly different sausage formulation significantly altered the results. Frankfurters produced in Example 4 had the better uniformity of color hue from day to day than frankfurters made by the commercial prior art process of Example 3. This is a significant advantage of the present invention over the prior art. The prior art dip method which places peeled uncolored sausages into a vessel containing norbixin produces frankfurters of varying color intensity as the norbixin colorant solution becomes spent (i.e used and old). The solution must periodically have more colorant added to restore its strength, but color will vary depending upon whether frankfurters are colored in a fresh or old solution or whether and when additional colorant was added to the solution, relative to a particular frankfurter's residence time. Uniformity of color hue from one frankfurter to another in this process depends upon residence time in the norbixin solution, and solution strength (norbixin concentration), among other variables.

After peeling, sausages made with casings according to the invention demonstrated very good color transfer of the visually perceptible orange bixin from the casing to the surface of the frankfurter.

EXAMPLES 9–13

Commercially produced nonfibrous cellulosic casings were used to prepare the casing of Example 9–13. Example 9 was a control casing (Not of the Invention) which was a clear shirred casing which contained no bixin, but did contain a peeling aid and anti-pleat lock agent and is commercially available from Viskase Corp. under the Trademark E-Z PEEL® NOJAX® casing. Example 10 was a comparative example in which the Bixin Mixture δ was sprayed onto the interior surface of the casing during shirring at a rate of 360 mg. of mixture δ per 100 square inches of coated casing surface. Examples 11 and 12 were similarly spray coated with Bixin Mixture 1D and 1C respectively at the 360 mg. per 100 sq. inch rate. Example 13 was similarly spray coated, but with Bixin Mixture 1E at a rate of 430 mg/100 in$^2$. The coherency (ability to remain formed as a self-sustained shirred stick) was determined to be poor for Example 10, fair for Example 13 and relatively poor for Examples 11 and 12.

The casings of Examples 9–13 were stuffed with a double minced, all pork frankfurter meat emulsion and the encased frankfurters were thermally processed at 20% relative humidity, cold water showered and held overnight at 40° F. and then evaluated. Control sample 9 produced a frankfurter which was white/pink in color and typical of a frankfurter made in a non-self-coloring casing. Comparative Example 10 produced frankfurters which were light and yellow orange in color relative to frankfurters produced by casings of Examples 11–13 all of which were a darker reddish-orange color. The color of Example 10 was evaluated as unsatisfactory for matching annatto colored sausages sold in Brazil because of its lightness and yellowness. Examples 11–13 all were evaluated as having a satisfactory color match. All bixin spray coated casings (Examples 10–13) had lines, streaks and pleat marks which were visible during stuffing, and processing and after peeling were visible on the frankfurter surfaces. The colorant also readily transferred to hands during hard peeling and smudging of the pleat and streak marks occurred for all Examples 10–13. L,a,b values were determined for the encased and peeling frankfurters and are reported in Table 3 below.

TABLE 3

| Example | L | σ | a | σ | b | σ |
|---|---|---|---|---|---|---|
| 9*† | 60.73 | 0.78 | 11.28 | 0.40 | 14.61 | 0.25 |
| 10† | 49.79 | 1.25 | 26.90 | 1.78 | 30.34 | 0.64 |
| 11† | 41.58 | 2.00 | 35.71 | 1.08 | 22.20 | 1.28 |
| 12† | 41.84 | 2.56 | 35.72 | 1.55 | 22.48 | 1.64 |
| 13† | 46.53 | 1.91 | 35.08 | 1.39 | 22.17 | 1.23 |
| 9*†† | 61.21 | 0.68 | 11.32 | 0.41 | 14.15 | 0.35 |
| 10†† | 54.28 | 0.90 | 22.02 | 1.55 | 30.92 | 0.49 |

TABLE 3-continued

| Example | L | σ | a | σ | b | σ |
|---|---|---|---|---|---|---|
| 11†† | 45.43 | 1.78 | 33.30 | 1.74 | 23.79 | 1.13 |
| 12†† | 46.01 | 2.40 | 33.04 | 2.29 | 24.20 | 1.59 |
| 13†† | 46.63 | 1.58 | 31.81 | 1.85 | 24.87 | 0.94 |

*Commercially made clear, uncolored NOJAX ® cellulose casing.
† Values measured are of the encased frankfurter surface.
†† Values measured are of the peeled (casing removed) frankfurter surface.
σ Standard deviation.

It is seen that the desirably colored encased frankfurters of Examples 11–13 as well as the corresponding peeled frankfurters made with the inventive self-coloring casing and composition have a coloration in which L,a,b values fall within the range 41<L<47
31<a<36
21<b<25 whereas the coloration of peeled frankfurters of Examples 9 and 10 are outside these ranges.

EXAMPLES 14–17

Commercially produced, non fibrous, cellulose casings were vertically slugged with Bixin Mixtures 1F, 1H, 1G and 1A respectively, with casing passing over an approximately 10 foot slug of colorant composition and drying the slugged casing while in an inflated condition. Lengths of each casing were stuffed with a meat emulsion and thermally processed. Frankfurters produce in the casings had an annatto color appearance which was evaluated as fair for Examples 14 and 15, Example 16 was good and Example 17 was very good, all evaluations being relative to one another. All colors were evaluated as having acceptable color levels for commercially produced annatto colored sausages.

EXAMPLE 18

A nylon multilayer film sheet having three layers comprising nylon 6/66 copolymer surface layers directly adhered on opposing sides of a core layer comprising an ethylene vinyl acetate copolymer blended with a minor amount of an ethylene methyl acrylic acid copolymer was formed into a tube and placed inside a small diameter, nonfibrous cellulose sausage casing for support. The supported nylon casing was then slugged with a bixin mixture which was comprised of 12.0 parts Bixin Mixture A, 71.1 parts of 7% HPC aqueous solution, 3.9 parts glycerine, 3.9 parts of 15% polyphosphate aqueous solution (Brifisol® 512), 0.5 parts of Vitamin E, and 8.6 parts of a 3.8% bixin suspension in vegetable oil (A-400-S). The slugged casing was air dried and then stuffed with an all pork meat emulsion and cooked for about 30 minutes in an oven set at 100° C. The bixin colorant satisfactorily transferred from the nylon surface to the frankfurter surface.

EXAMPLE 19

Commercially produced nonfibrous cellulose sausage casings were slug coated using a process as described below with reference to the drawing. The coating speed at which the casing traveled over the colorant slug was about 50 feet per minute and the coated casing was air dried with a brief passage through an infrared heater set to provide a temperature of about 230° F. The colorant composition was made by mixing 12 parts by weight of Bixin Mixture B, with 5 parts of a 3.8% suspension of bixin in oil (A-400-S), 4.0 parts of a 15.0% solution of a blend of polyphosphates (Brifisol 512) in deionized water, 4.0 parts glycerine, 21.0 parts of a 2.0% aqueous solution of the sodium salt of carboxymethylcellulose, 0.5 parts of a tocopherol, 0.5 parts of a surfactant (Tween® 20), 5 parts of 20% solution of carnauba wax in Bixin Mixture B, and 50.0 parts of a 30.0% shellac solution to form a colorant composition having 102 parts total. The shellac solution contained 30% of an edible food grade shellac, 1.0% triethanolamine, 4.0% of ammonia solution and 65% deionized water.

The casing coated with the above colorant composition was used to manufacture frankfurters. Frankfurters made with the inventive casing and colorant composition of Example 19 were dark orangish red in color with good uniformity and an excellent resistance to color rub off. Surprisingly, this rub off resistance was noted to be as good as or better than the inventive compositions containing alcohol. The good rub off resistance is believed to be due to the presence of shellac in the colorant composition.

THE DRAWING

Referring now to the drawing, FIG. 1 is a schematic view of a preferred slug coating operation 10. A reel 11 supplies flattened semi-finished casing 12 around elevated transfer guide roll 13 and through opposing nip rolls 14a, 14b. The transfer roll 13 is spaced apart from the nip rolls 14a, 14b and slightly elevated relative to nip point 15. Nip point 15 is where the nip rolls 14a and 14b are held against or in close proximity to one another separated only by the casing 12. The nip rolls 14a, 14b will be positioned to keep the main body of slug 17 positioned between the nip rolls 14a, 14b and transfer roll 13 while allowing the desired amount of the slug to coat the interior surface of the casing 12 and pass through the nip rolls. The force of gravity pulls downward in direction as indicated by arrow A. A portion 16 of casing 12 contains a mass (slug) of colorant coating composition 17 in contact with an interior surface of said casing. Casing portion 16 forms an angle α with a plane located perpendicular to the gravitational pull indicated by arrow A. Preferably the angle a will be between 0°<α<90°, and most preferably about 30° to provide a smooth uniform coating of the colorant composition on the interior surface of casing portion 16. Gravity holds the slug 17 in place between elevated roll 13 and nip rolls 14a, 14b and is assisted by the continuous movement of casing 16 towards the nip point 15. Preferably the casing is supported between roll 13 and nip rolls 14a, 14b by a support tray (not shown) which has a low coefficient of friction. Support of the slugged filled casing may also be provided by other means including e.g. a series of rollers or a travelling belt. If necessary, elevated transfer roll 13 may be replaced by another set of nip rolls to hold the slug 17 in the desired position. Of course it will be appreciated that the slug 17 may be held in any desired position preferably with horizontal to vertical positions having nip point 15 no higher than the starting point of the slug 17. Optionally, roll 13 may be replaced by a set of nip rolls which are located 0–90° lower than nip point 15 relative to the above noted plane.

The speed of travel of the casing 12 between transfer roll 13 and nip rolls 14a and 14b may be increased or decreased to adjust the amount of coating taken up by the casing. Also, the pressure exerted at nip point 15 where the nip rolls 14a and 14b meet may be adjusted i.e. increased or decreased to alter the amount of coating taken up, and the composition and character of the nip rolls themselves may also be altered e.g. by use of nip roll materials of different densities, hardness, size or shape. Nip rolls 14a, 14b maintain the slug 17 in casing portion 16, but the colorant composition 17 will coat the casing 12 and interiorly coated casing 18 will exit nip rolls 14a, 14b in an inflated state directed by transfer means 19 which directs casing 18 through drying means 20 such as a bank of infrared heaters which are radially displaced around a longitudinal axis of the tubular casing 18. Other types of dryers or drying means may also be employed instead of or in addition to infrared heaters such as microwave or convection ovens. Beneficially, the preferred dryer may be a hot air or convection oven which are believed to be more economical and efficient than infrared heaters. After exiting drying means 20, inflated casing 18 is transferred via guide means 21, 22 through an optional second drying means 23 and the casing (with a coating that is now dry to the touch) is collapsed into a second set of opposing nip rolls 24a, 24b and wound on wind up reel 25 assisted by guide roll 26. The casing between first nip rolls 14a, 14b and second nip rolls 24a, 24b is maintained in a inflated condition to promote drying of the coating without blocking or adherence between opposing or adjacent inner surfaces of the casing. In view of the present disclosure, it should be understood that the distance between the two sets of nip rolls may be varied, one or more dryers may be used, dryer lengths may be varied as well as such parameters as dryer temperature and humidity to control the rate and amount of drying. Proper drying conditions may be established by one skilled in the art without undue experimentation.

Therefore, it should be clear from the above that casing from reels or in line with an extrusion set up or other casing formation operation may be transferred to a slug coating operation where the casing 12 passes a mass 17 of bixin containing colorant coating composition which is trapped by gravity and nip rolls 14a, 14b. Of course it will be apparent to one skilled in the art that the slug 17 may be held by multiple sets of nip rolls in any position including vertical or horizontal although a slight downward incline having an angle α of 30° has been found to work well. The casing 12 which is introduced to the slugging operation may be made of cellulose, a cellulose derivative, a plastic coated cellulose (such as MP® fibrous casing sold by Viskase Corporation), or a thermoplastic such as nylon, and the casing may be monolayer or multilayer. Also, the introduced casing may be manufactured just prior to coating in a continuous or semi-continuous or batch operation, or it may be commercially available casing obtained in the open market. Furthermore, although the slugging operation described above is made in reference to semi-finished cellulose casing it may be applied to coat gel stock casing as well as other casings made from various materials. Also, while the casing is depicted as being wound on a reel it may go directly and continuously to a shirring operation where it would be shirred into sticks of casing. Peeling aids and anti-pleat lock agents and other coatings may be applied admixed with the color coating or as separate coatings applied e.g. by a second slugging operation or preferably by spraying during a shirring operation. Peeling aids will preferably be applied to the already dried colorant coated casing.

Referring now to FIG. 2, a series of sausages 30 encased with the inventive casing 31 are depicted. The casing 31 has its interior surface coated with a bixin containing colorant composition in accordance with the present invention. When coated on a clear transparent casing, the casing is visibly colored, preferably orange, and the encased sausages 30 have a colored appearance, preferably orange. Cooked sausage link 32 is depicted with a casing portion 33 partially peeled away from the sausage surface 34. Sausage surface 34 has been visibly colored, preferably orange, by transfer of the bixin colorant from the casing 31 to the sausage surface 34 where the bixin is preferably and advantageously fixed to provide a coating that is uniform in appearance and which does not easily or extensively rub off (a very small amount of pigment may come off after processing, but it is not so much as to visibly and noticeably affect the color of the sausage).

Desirably, the bixin colored foodstuffs will be vacuum packaged after pasteurization help prevent oxidation of bixin by oxygen. Vacuum packaging, particularly in a material having low permeability to oxygen will beneficially increase shelf life and prevent premature fading or discoloration.

In view of the above description and examples, and the following claims, different embodiments, modifications and changes will be apparent to those skilled in the art and all such modifications, embodiments and changes are deemed to be within the scope of the inventions defined by the following claims.

What is claimed is:

1. A food casing having a surface coating comprising a dispersion of bixin in a water-soluble and/or alcohol-soluble film forming agent of a cellulose derivative, a protein, a dextrin, a shellac, a starch, or a starch derivative, or mixture of said film forming agents in an amount effective to color a foodstuff encased therein during cooking or pasteurization.

2. A food casing, as defined in claim 1, wherein said food casing is cellulosic.

3. A food casing, as defined in claim 1, wherein said casing is a nonfiber-reinforced casing.

4. A food casing, as defined in claim 1, wherein said casing has a circumference less than 115 millimeters (mm).

5. A food casing, as defined in claim 1, wherein said casing is a thermoplastic film.

6. A food casing, as defined in claim 1, wherein said casing is a polyvinylidene chloride copolymer coated fiber-reinforced cellulose casing.

7. A food casing, as defined in claim 1, wherein said casing is a nylon casing.

8. A food casing, as defined in claim 1, wherein said casing is a polyolefin casing.

9. A food casing, as defined in claim 1, wherein said casing is a multilayer casing.

10. A food casing, as defined in claim 1, wherein said foodstuff is meat or cheese.

11. A food casing, as defined in claim 1, wherein said film forming agent comprises protein.

12. A food casing, as defined in claim 1, wherein said casing is suitable for holding a food therein during pasteurization.

13. A food casing, as defined in claim 1, wherein said film forming agent comprises a water-soluble dextrin, a starch or starch derivative.

14. A food casing, as defined in claim 1, wherein said film forming agent comprises a water-soluble cellulose ether.

15. A food casing, as defined in claim 14, wherein said water-soluble cellulose ether comprises a nonionic water-soluble alkyl or hydroxyalkyl cellulose ether.

16. A food casing, as defined in claim 15, wherein said ether comprises hydroxypropylcellulose.

17. A food casing, as defined in claim 1, wherein said film forming agent comprises shellac.

18. A food casing, as defined in claim 1, wherein said coating further comprises a polyphosphate.

19. A food casing, as defined in claim 1, wherein said coating is coated on said casing in an amount which provides about 0.1 to 1.2 mg. of bixin per square inch of coated casing surface.

20. A food casing, as defined in claim 1, wherein said film forming agent is present in an amount which provides about 0.1 to 1.2 mg. per square inch of coated casing surface.

21. A food casing, as defined in claim 18, wherein said polyphosphate is present in an amount between 0.01 to 0.10 mg. per square inch of coated casing surface.

22. A food casing, as defined in claim 1, wherein said coating further comprises an antioxidant.

23. A food casing, as defined in claim 22, wherein said antioxidant comprises a tocopherol, or Labiatae plant extract.

24. A food casing, as defined in claim 1, wherein said coating further comprises a surfactant.

25. A food casing, as defined in claim 1, wherein said coating further comprises an alcohol.

26. A food casing, as defined in claim 1, wherein said coating further comprises ethanol.

27. A food casing, as defined in claim 1, wherein said coating further comprises a second portion of bixin in an oil carrier.

28. A food casing, as defined in claim 1, wherein said coating further comprises an edible oil.

29. A food casing, as defined in claim 1, wherein said dispersion is a uniform dispersion having a fineness of grind of 4 gu or less as measured by test method ASTM D 1316.

30. A food casing, as defined in claim 1, wherein said dispersion has a fineness of grind which is greater than or equal to 2 and less than or equal to 3 gu as determined by measurement using test method ASTM D 1316.

31. A food casing, as defined in claim 1, wherein said casing has L, a, b values such that:

$55<L<70$ $15<a<25$ $20<b<30$.

32. A food casing, as defined in claim 1, wherein said casing has an internal coating of a peeling aid composition in an amount sufficient to facilitate machine peeling of said casing from an encased processed foodstuff.

33. A food casing, as defined in claim 32, wherein said peeling aid composition is applied over said internal coating of dispersed bixin thereby forming two distinct coating layers.

34. A food casing, as defined in claim 32, wherein said internal coating containing bixin dispersed in a film forming agent has said internal coating of a peeling aid uniformly mixed therein and both bixin and peeling aid are applied as a mixture to said casing to form a unitary layer.

* * * * *